(12) United States Patent
Takahashi et al.

(10) Patent No.: US 11,097,565 B2
(45) Date of Patent: Aug. 24, 2021

(54) THERMALLY EXPANDABLE SHEET

(71) Applicant: CASIO COMPUTER CO., LTD., Tokyo (JP)

(72) Inventors: Hideki Takahashi, Ome (JP); Yuji Horiuchi, Higashiyamato (JP); Yoshimune Motoyanagi, Hamura (JP); Satoshi Mitsui, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 118 days.

(21) Appl. No.: 16/389,521

(22) Filed: Apr. 19, 2019

(65) Prior Publication Data
US 2019/0329577 A1 Oct. 31, 2019

(30) Foreign Application Priority Data
Apr. 27, 2018 (JP) .............................. JP2018-087431

(51) Int. Cl.
*B32B 3/10* (2006.01)
*B41M 3/06* (2006.01)
(Continued)

(52) U.S. Cl.
CPC ............. *B41M 3/06* (2013.01); *B29C 44/022* (2013.01); *B29C 44/3415* (2013.01);
(Continued)

(58) Field of Classification Search
None
See application file for complete search history.

(56) References Cited

U.S. PATENT DOCUMENTS 5,122,430 A 6/1992 Nishitsuji et al.
5,846,622 A 12/1998 Imaeda
(Continued)

FOREIGN PATENT DOCUMENTS

DE 102008049595 A1 4/2010
EP 0376322 A2 7/1990
(Continued)

OTHER PUBLICATIONS

Machine translation of JP2001150812A (Year: 2001).*
(Continued)

*Primary Examiner* — Christopher M Polley
(74) *Attorney, Agent, or Firm* — Hotlz, Holtz & Volek PC

(57) ABSTRACT

A thermally expandable sheet includes a base, a thermally expansive layer, and a color adjustment layer. The thermally expansive layer is provided on a first side of the base and includes a thermally expandable material that distends in accordance with an amount of heat absorbed, the heat being generated from a thermal conversion layer that includes a thermal conversion material that converts electromagnetic waves to heat. The color adjustment layer is provided on at least one of the thermally expansive layer and a second side of the base and includes a color adjusting agent. When the thermal conversion layer is provided on the color adjustment layer, the color adjustment layer reduces a visual difference in color between a first region where the thermal conversion layer is provided and a second region where the thermal conversion layer is not provided.

21 Claims, 20 Drawing Sheets

(51) Int. Cl.
*B29C 44/02* (2006.01)
*B41M 5/392* (2006.01)
*B41M 7/00* (2006.01)
*B41M 5/385* (2006.01)
*B29C 44/34* (2006.01)
*B32B 29/00* (2006.01)
*B29K 105/04* (2006.01)
*B32B 27/10* (2006.01)

(52) U.S. Cl.
CPC .......... *B32B 29/002* (2013.01); *B41M 5/385* (2013.01); *B41M 5/392* (2013.01); *B41M 7/009* (2013.01); *B29K 2105/04* (2013.01); *B32B 27/10* (2013.01); *Y10T 428/24802* (2015.01); *Y10T 428/24934* (2015.01)

(56) References Cited

U.S. PATENT DOCUMENTS

| | | |
|---|---|---|
| 6,319,613 B1 | 11/2001 | Takeda et al. |
| 7,802,881 B2 | 9/2010 | Sadohara |
| 8,007,578 B2 | 8/2011 | Bhatt |
| 8,080,307 B2 | 12/2011 | Demartin et al. |
| 8,157,905 B2 | 4/2012 | Lewis et al. |
| 8,362,130 B2 | 1/2013 | Demartin et al. |
| 8,888,241 B2 | 11/2014 | Tabayashi |
| 9,579,833 B2 | 2/2017 | Horiuchi |
| 9,663,675 B2 | 5/2017 | Jarvis |
| 10,005,208 B2 | 6/2018 | Horiuchi |
| 10,414,076 B2 | 9/2019 | Horiuchi |
| 2005/0203233 A1 | 9/2005 | Fugiel et al. |
| 2006/0216485 A1 | 9/2006 | Lin et al. |
| 2007/0082963 A1 | 4/2007 | Bhatt |
| 2007/0256782 A1 | 11/2007 | Haldeman et al. |
| 2008/0241492 A1 | 10/2008 | Demartin et al. |
| 2009/0115826 A1 | 5/2009 | Sadohara |
| 2009/0202753 A1 | 8/2009 | Teramae et al. |
| 2010/0059691 A1 | 3/2010 | Lewis et al. |
| 2010/0080579 A1 | 4/2010 | Yamaguchi et al. |
| 2010/0080580 A1 | 4/2010 | Yamaguchi et al. |
| 2011/0206429 A1 | 8/2011 | Terao et al. |
| 2011/0243629 A1 | 10/2011 | Roberts et al. |
| 2012/0065313 A1 | 3/2012 | Demartin et al. |
| 2013/0065979 A1 | 3/2013 | Kummet et al. |
| 2013/0161874 A1 | 6/2013 | Horiuchi |
| 2013/0229478 A1 | 9/2013 | Horiuchi |
| 2015/0343796 A1 | 12/2015 | Ohnishi |
| 2016/0168407 A1 | 6/2016 | Jarvis |
| 2017/0144339 A1 | 5/2017 | Horiuchi |
| 2018/0015772 A1 | 1/2018 | Okada et al. |
| 2018/0264692 A1 | 9/2018 | Horiuchi |
| 2018/0272781 A1 | 9/2018 | Takahashi et al. |
| 2018/0274087 A1 | 9/2018 | Takahashi et al. |
| 2019/0033743 A1 | 1/2019 | Azzam et al. |
| 2019/0263170 A1 | 8/2019 | Okada et al. |
| 2020/0086668 A1 | 3/2020 | Fujita et al. |

FOREIGN PATENT DOCUMENTS

| | | | |
|---|---|---|---|
| EP | 1008564 A1 | | 6/2000 |
| EP | 1790701 A1 | | 5/2007 |
| EP | 1954768 A1 | | 8/2008 |
| GB | 2516773 A | | 2/2015 |
| JP | 64028660 A | | 1/1989 |
| JP | H09207428 A | | 8/1997 |
| JP | 2001150812 A | * | 6/2001 |
| JP | 2001150812 A | | 6/2001 |
| JP | 2002067509 A | | 3/2002 |
| JP | 2003089275 A | | 3/2003 |
| JP | 2004168842 A | | 6/2004 |
| JP | 2005187323 A | | 7/2005 |
| JP | 2006212991 A | | 8/2006 |
| JP | 2006220740 A | | 8/2006 |
| JP | 2010076132 A | * | 4/2010 |
| JP | 2013097211 A | | 5/2013 |
| JP | 2013132765 A | | 7/2013 |
| JP | 2014168851 A | | 9/2014 |
| JP | 2015117353 A | | 6/2015 |
| JP | 2016009634 A | | 1/2016 |
| JP | 2016125829 A | | 7/2016 |
| JP | 2016162500 A | | 9/2016 |
| JP | 2016199715 A | | 12/2016 |
| WO | 2007132214 A1 | | 11/2007 |
| WO | 2015015200 A1 | | 2/2015 |
| WO | 2016121842 A1 | | 8/2016 |
| WO | 2016167298 A1 | | 10/2016 |

OTHER PUBLICATIONS

Machine translation of JP2010076132A (Year: 2010).*
Japanese Office Action dated Apr. 7, 2020 (and English translation thereof) issued in Japanese Application No. 2018-087431.
Office Action (Non-Final Rejection) dated Feb. 18, 2021 issued in related U.S. Appl. No. 15/934,200.
Han et al. Nanoscale Research Letters 2011, 6:457. (Year: 2011).
Office Action (Non-Final Rejection) dated Sep. 24, 2020 issued in U.S. Appl. No. 15/934,371.
Related U.S. Appl. No. 15/934,200, filed: Mar. 23, 2018, Title: "Ink, Printing Apparatus, Printing Method, Manufacturing Method for Shaped Object, and Thermal Expansion Sheet;" =First Named Inventor: Hideki Takahashi.
Related U.S. Appl. No. 15/934,371, filed: Mar. 23, 2018, Title: "Ink, Thermal Expansion Sheet, Manufacturing Method for Shaped Object, Printing Apparatus, and Printing Method;" First Named Inventor: Hideki Takahashi.

* cited by examiner

PRESENT EMBODIMENT

COMPARATIVE EXAMPLE

PRINT THERMALCONVERSION LAYER
ON BACK SIDE

IRRADIATE BACK SIDE WITH
ELECTROMAGNETIC WAVES

PRINT THERMALCONVERSION LAYER ON BACK SIDE

IRRADIATE BACK SIDE WITH ELECTROMAGNETIC WAVES

THERMALLY EXPANDABLE SHEET

CROSS-REFERENCE TO RELATED APPLICATION

This application claims the benefit of Japanese Patent Application No. 2018-087431, filed on Apr. 27, 2018, the entire disclosure of which is incorporated by reference herein.

FIELD

This application relates generally to a thermally expandable sheet.

BACKGROUND

In the related art, thermally expandable sheets are known in which a thermally expansive layer containing a thermally expandable material, which foams and distends in accordance with the amount of heat absorbed, is formed on one side of a base. By forming a layer that converts light to heat on the thermally expandable sheet and irradiating this layer with light, the thermally expansive layer can be caused to distend in part or in whole. Additionally, methods are known in the related art for forming a three-dimensionally shaped object on a thermally expandable sheet by changing the shape of the layer that converts light to heat (see, for example, Unexamined Japanese Patent Application Kokai Publication No. S64-28660 and Unexamined Japanese Patent Application Kokai Publication No. 2001-150812).

It is known that the color of the layer that converts light to heat (thermal conversion layer) impacts the appearance of the shaped object. For example, in a case in which a shaped object is formed by bumps of a thermal conversion layer without performing color printing on the layer that converts light to heat (thermal conversion layer), the color of the thermal conversion layer will appear as-is.

As such, there are demands to make the thermal conversion layer less conspicuous and reduce the impact of the color of the thermal conversion layer on the appearance of the shaped object.

In light of this problem, an object of the present disclosure is to provide a thermally expandable sheet capable of reducing the impact of the color of the thermal conversion layer.

SUMMARY

A thermally expandable sheet includes a base, a thermally expansive layer, and a color adjustment layer. The thermally expansive layer is provided on a first side of the base and includes a thermally expandable material that distends in accordance with an amount of heat absorbed, the heat being generated from a thermal conversion layer that includes a thermal conversion material that converts electromagnetic waves to heat. The color adjustment layer is provided on at least one of the thermally expansive layer and a second side of the base and includes a color adjusting agent. When the thermal conversion layer is provided on the color adjustment layer, the color adjustment layer reduces a visual difference in color between a first region where the thermal conversion layer is provided and a second region where the thermal conversion layer is not provided.

A thermally expandable sheet includes a base; a thermally expansive layer, and a first ink receiving layer. The thermally expansive layer is provided on a first side of the base and includes a thermally expandable material that distends in accordance with an amount of heat absorbed, the heat being generated from a thermal conversion layer that includes a thermal conversion material that converts electromagnetic waves to heat. The first ink receiving layer is provided on the thermally expansive layer and includes a color adjusting agent. When the thermal conversion layer is provided on the first ink receiving layer, the first ink receiving layer reduces a visual difference in color between a first region where the thermal conversion layer is provided and a second region where the thermal conversion layer is not provided.

A thermally expandable sheet includes a base and a thermally expansive layer. The thermally expansive layer is provided on a first side of the base and includes a thermally expandable material that distends in accordance with an amount of heat absorbed, the heat being generated from a thermal conversion layer that includes a thermal conversion material that converts electromagnetic waves to heat. The thermally expansive layer further includes a color adjusting agent, and when the thermal conversion layer is provided on the thermally expansive layer, the thermally expansive layer reduces a visual difference in color between a first region where the thermal conversion layer is provided and a second region where the thermal conversion layer is not provided.

BRIEF DESCRIPTION OF THE DRAWINGS

A more complete understanding of this application can be obtained when the following detailed description is considered in conjunction with the following drawings, in which.

DETAILED DESCRIPTION

Hereinafter, thermally expandable sheets according to embodiments of the present disclosure are described in detail using the drawings.

In this application, the term "shaped object" includes a wide range of shapes such as simple shapes, geometrical shapes, characters, and decorations. The term "decorations" refers to objects that appeal to the aesthetic sense through visual and/or tactile sensation. The term "shaped (or molded)" does not simply refer to the forming of a shaped object, but should be construed to also include concepts such as decorating and ornamenting. The term "decorative shaped object" refers to a shaped object formed as a result of decorating or ornamenting.

The shaped object according to the present embodiment uses, as a reference, a particular two-dimensional plane (for example, the XY plane) within three-dimensional space, and includes unevenness in a direction perpendicular (for example, the Z-axis direction) to that plane. This shaped object is an example of a three-dimensional (3D) image, but to distinguish this shaped object from a three-dimensional image produced using a so-called 3D printing technique, the shaped object is called a 2.5-dimensional (2.5D) image or a pseudo-three-dimensional (Pseudo-3D) image. Furthermore, the technique for producing this shaped object is an example of a three-dimensional image printing technique, but to distinguish this technique from a so-called 3D printer, the technique is called a 2.5-dimensional (2.5D) printing technique or a pseudo-three-dimensional (Pseudo-3D) printing technique.

Embodiment 1

Thermally Expandable Sheet 11

Figure 1:
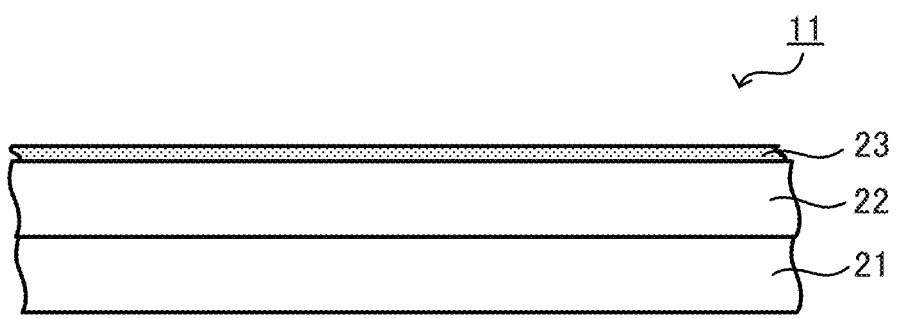
FIG. 1 is a cross-sectional view schematically illustrating a thermally expandable sheet according to Embodiment 1.

As schematically illustrated in FIG. 1, a thermally expandable sheet 11 includes a base 21, a thermally expansive layer 22, and a color adjustment layer 23. As described in detail later, with the thermally expandable sheet 11, the printing device and the expansion device that are summarily illustrated in FIG. 5 and the like are used to distend at least a portion of the thermally expansive layer 22 of the thermally expandable sheet 11. Moreover, a raised or uneven portion is formed on the surface of the thermally expansive layer 22 as a result of at least a portion of the thermally expansive layer 22 rising. In the present embodiment, shaped objects can be expressed by combining the heights of the raised or uneven portions, the positions at which the raised or uneven portions are formed, and the like.

The base 21 is implemented as a sheet-like member that supports the thermally expansive layer 22 and the like. The thermally expansive layer 22 is formed on a first side (the front side, the top surface in FIG. 1) of the base 21. Paper such as high-quality paper, or a sheet (including films) made from a resin such as polyethylene terephthalate (PET) is used as the base 21. The paper is not limited to high-quality paper, and any type of paper that is commonly used can be used. Additionally, the resin is not limited to PET, and any resin can be used. Examples of the resin include materials selected from polyolefin resins such as polyethylene and polypropylene, polyester resins, polyamide resins such as nylon, polyvinyl chloride resins, polyimide resins, and silicone resins. The base 21 has sufficient strength so that, when the thermally expansive layer 22 distends in part or in whole due to foaming, the opposite side of the base 21 (the underside illustrated in FIG. 1) does not rise. Moreover, the base 21 has sufficient strength so that, when the thermally expansive layer 22 distends, wrinkles, large undulations, and the like, which impair the form of the base 21 as a sheet, do not form. Additionally, the base 21 has heat resistance sufficient to withstand the heating that is performed to foam the thermally expansive layer 22. The base 21 may have elasticity. Furthermore, the base 21 may deform in accordance with the distension of the thermally expansive layer 22, and the deformed shape of the base 21 may be maintained after the distension of the thermally expansive layer 22.

The thermally expansive layer 22 is formed on a first side (the top surface in FIG. 1) of the base 21. The thermally expansive layer 22 is a layer that distends to a size that corresponds to the heating process (for example, the heating temperature and heating time), and includes a thermally expandable material (thermally expandable microcapsules, micropowder) dispersed/disposed in a binder. While described in detail later, in the present embodiment, an electromagnetic wave thermal conversion layer (hereinafter also referred to simply as "thermal conversion layer" or "conversion layer") that converts electromagnetic waves to heat is formed on the top side (the front side) of the thermally expandable sheet 11 and/or the underside (the back side) of the thermally expandable sheet 11, and is irradiated with electromagnetic waves to cause the thermal conversion layer to generate heat. The thermal conversion layer is heated due to being irradiated with electromagnetic waves and, as such, is also called a "heated layer." The heat generated by the thermal conversion layer provided on the front side and/or the back side of the thermally expandable sheet 11 is transmitted to the thermally expansive layer 22. As a result, the thermally expandable material in the thermally expansive layer 22 foams and distends. The electromagnetic waves are converted to heat more quickly where the thermal conversion layer is provided than in other regions where the thermal conversion layer is not provided. As such, the regions near the thermal conversion layer can be exclusively and selectively heated, and specific regions of the thermally expansive layer 22 can be exclusively and selectively caused to distend.

The number of layers of the thermally expansive layer 22 is not limited to one. The thermally expansive layer 22 may include a plurality of layers that contain the thermally expandable material. Moreover, the thermally expansive layer 22 may be formed by stacking these layers.

Any thermoplastic resin, such as an ethylene-vinyl-acetate polymer or an acrylic polymer, may be used as the binder of the thermally expansive layer 22. The thermally expandable microcapsules contain propane, butane, or a similar low boiling point volatile substance in thermoplastic resin shells. The shells are formed from a thermoplastic resin such as, for example, polystyrene, polyvinyl chloride, polyvinylidene chloride, polyvinyl acetate, polyacrylic acid ester, polyacrylonitrile, polybutadiene, and copolymers thereof. In one example, the average particle size of the thermally expandable microcapsules is about 5 to 50 μm. When these microcapsules are heated to the thermal expansion start temperature or higher, the shells that are made from the resin soften and the low boiling point volatile substance encapsulated therein vaporizes. The pressure resulting from this vaporization causes the shells to distend in a balloon-like manner. While dependent on the characteristics of the microcapsules to be used, the particle size of the microcapsules distends to about five-times larger than that prior to distending. Note that there is variance in the particle sizes of the microcapsules and all of the microcapsules do not have the same particle size.

The color adjustment layer (first color adjustment layer) 23 contains a color adjusting agent. The color adjustment layer 23 is provided on the thermally expansive layer 22. The color adjusting agent is a material that exhibits a color. The color adjusting agent includes a colorant (dye, pigment) and the like. Provided that the colorant exhibits color, any material other than materials generally used as pigments and dyes may be used. The color adjustment layer 23 exhibits color due to the color adjusting agent. As described later, a thermal conversion layer and/or a color ink layer is provided on a part or the whole of the color adjustment layer 23. The color adjustment layer 23 of the present embodiment has a function of reducing a visual difference between the color adjustment layer 23 and the thermal conversion layer provided on the color adjustment layer 23. As such, in order to make the thermal conversion layer less conspicuous, the color adjustment layer 23 is colored with a color that is the same or substantially the same as the color of the thermal conversion layer. The color adjustment layer 23 may be formed over the entire thermally expansive layer 22, or may be provided only in regions where the shaped object is to be formed or may be formed. The color adjustment layer 23 need not be formed in regions where the shaped object will not be formed, such as regions where there is no possibility of printing (for example, the margins).

Any colorant (pigment or the like) may be used as the color adjusting agent. While not limited hereto, examples of coloring pigments include C.I. Pigment Yellow 1, 3, 12, 13, 14, 17, 24, 34, 35, 37, 42 (yellow iron oxide), 53, 55, 74, 81, 83, 87, 93, 94, 95, 97, 98, 100, 101, 104, 108, and 109; C.I. Pigment Orange 16, 36, and 38; C.I. Pigment Red 1, 2, 3, 5, 17, 22, 23, 31, 38, 48:1, 48:2, 48:4, 49:1, 53:1, 57:1, 63:1, 63:2, 64:1, 81, 101 (red iron oxide), 144, 146, and 185; C.I. Pigment Violet 19, 23, 29, 30, 37, 40, and 50; C.I. Pigment Blue 1, 2, 15, 15:1, 15:2, 15:3, 15:4, 15:6, 18, and 60; C.I. Pigment Green 1, 4, 7, 8, 10, 17, 18, and 36; and the like. Examples of white pigments include titanium oxide, calcium carbonate, barium sulfate, and the like. Examples of black pigments include carbon black and the like.

For ease of description, in this application, the color adjustment layer 23 is referred to as a layer. However, the color adjustment layer 23 may have an indistinct boundary as a layer. For example, depending on the printing method and the type of ink, a portion of the color adjustment layer 23 may enter into the thermally expansive layer 22, or the adjustment layer may be provided as a printed dot pattern. Provided that the color adjustment layer 23 uses ink or the like and is formed on the thermally expansive layer 22, the color adjustment layer 23 in this specification shall be construed to encompass forms that do not have distinct boundaries.

Figure 2:
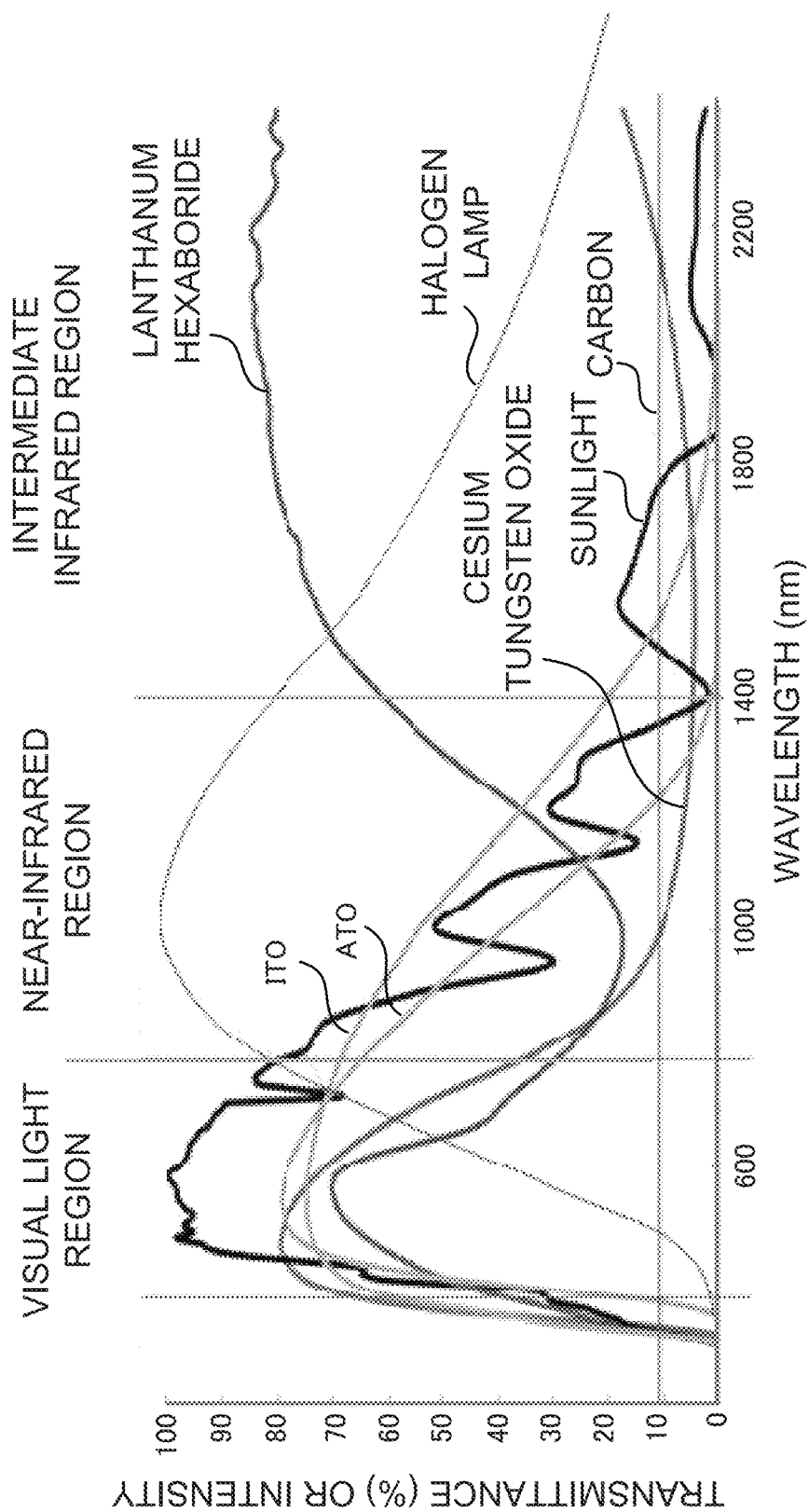
FIG. 2 is a drawing illustrating distributions of the absorption rates of various materials, the sunlight intensity spectrum, and the spectral distribution of a halogen lamp.

The color of the color adjustment layer 23 is determined by the color of the thermal conversion layer. Specifically, the thermal conversion layer is formed using an ink that contains an electromagnetic wave thermal conversion material (hereinafter referred to as "foamable ink"). The electromagnetic wave thermal conversion material (thermal conversion material) is a material that is capable of converting electromagnetic waves to heat. Examples of the electromagnetic wave thermal conversion material include carbon and infrared absorbing agents. While not limited hereto, an inorganic infrared absorbing material can be used as the infrared absorbing agent. Preferable examples of the inorganic infrared absorbing material include metal hexaboride compounds and tungsten oxide compounds. As illustrated in FIG. 2, lanthanum hexaboride (LaB6) and cesium tungsten oxide have high absorption rates (low transmittance) in the near-infrared region, and also have high transmittance in the visible light spectrum. Accordingly, it is preferable that lanthanum hexaboride (LaB6) or cesium tungsten oxide is used as the thermal conversion material because the color of the thermal conversion layer can be suppressed. Any one of the materials described above may be used alone, or a combination of two or more different materials may be used.

The foamable ink may be any desired ink that contains the electromagnetic wave thermal conversion material. Examples thereof include water-based inks, oil-based inks, and ultraviolet-curable inks. As described later, the foamable ink is printed on the thermally expandable sheet 11 using a desired printing method selected from offset printing, flexographic printing, screen printing, gravure printing, or electronic printing such as ink jet printing. Whether the foamable ink is water-based, oil-based, or the like is determined according to the printing technique used to print on the thermally expandable sheet 11. Depending on the printing method, the foamable ink includes, at desired ratios, materials other than the electromagnetic wave thermal conversion material. Examples of these other materials include film forming components (resin), solvents, auxiliary agents, and the like.

In the present embodiment, the color adjustment layer 23 is provided and, as a result, the color difference between the thermally expandable sheet 11 and an ink layer 30 (corresponds to the thermal conversion layer) provided on the front side of the thermally expandable sheet 11 can be made less than in conventional configurations that do not include the color adjustment layer 23. As a result, the thermal conversion layer can be made less conspicuous than in conventional examples.

Figure 3A:
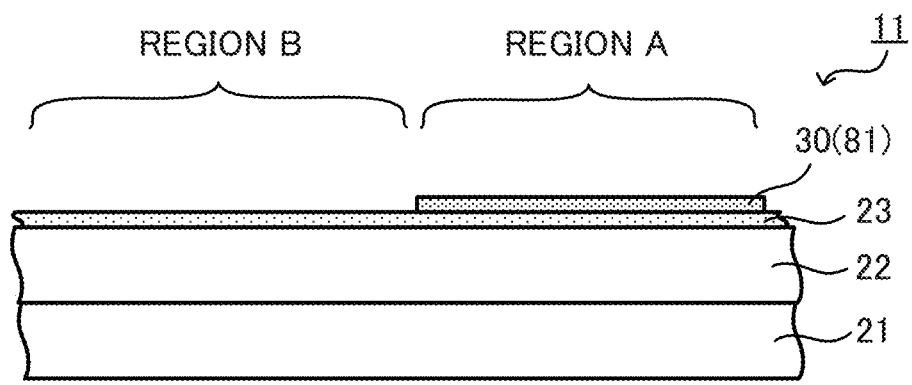
FIGS. 3A and 3B are drawings explaining regions where a color difference is measured.
Figure 3B:
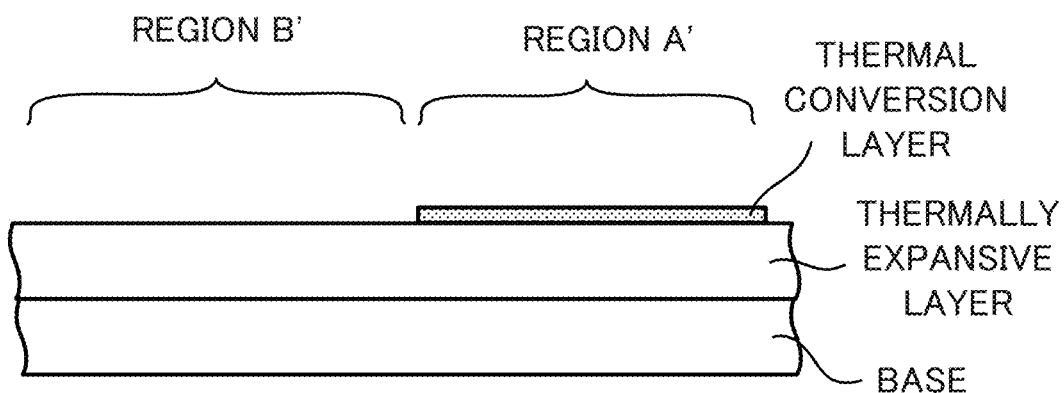

The comparison of the color differences is performed specifically as follows. As illustrated in FIG. 3A, the foamable ink is used to form the ink layer 30 (corresponds to the front side conversion layer 81) on the thermally expandable sheet 11. Here, the ink layer 30 is formed from the foamable ink. Then, the colors of a region A (first region), where the ink layer 30 is formed, and of a region B (second region), where the ink layer 30 is not formed, are observed from above the thermally expandable sheet 11 (the upward direction illustrated in FIG. 3A) and compared. Here, the color difference between the region A and the region B in FIG. 3A is reduced compared to the color difference between a region A' and a region B' of the conventional example illustrated in FIG. 3B. As a result, the ink layer formed from the foamable ink is less conspicuous, and the impact of the ink layer 30 (the thermal conversion layer) on the color of the shaped object can be suppressed. Note that, with the exception of the color adjustment layer 23, the conditions (material and thickness of the base and the thermally expansive layer, density of the foamable ink layer, and the like) of the thermally expandable sheet 11 of the conventional example and the thermally expandable sheet 11 of the present embodiment used in the comparison were identical. Accordingly, the color of the region A' corresponds to the color of the top surface of the base 21.

The L*a*b* color system (Lab color system) can be used for the color difference between the region A and the region B. Specifically, a color meter is used to measure numerical values of L*, a*, and b* for the front side of the thermally expandable sheet 11 where printing is not performed (region A) and the color on the foamable ink layer (thermal conversion layer 81) printed on the front side of the thermally expandable sheet. Next, a color difference ΔE* (ΔE) is calculated from the measured numerical values of L*, a*, and b*. This color difference ΔE is reduced in comparison with the color difference ΔE in conventional thermally expandable sheets that do not include a color adjustment layer 23. In other words, it is sufficient that the color difference ΔE between the region A and the region B is less than the color difference ΔE between the region A' and the region B'.

Furthermore, the color difference ΔE between the region A and the region B is preferably within a range of 6.5 to 13.0, or under this range (ΔE is 13.0 or less). Here, the 6.5 to 13.0 range color difference ΔE is called "class C tolerance," and is a color difference that corresponds to one step in the Munsell color system and the like. Furthermore, the color difference ΔE between the region A and the region B is preferably within a range of 3.2 to 6.5, or under this range (ΔE is 6.5 or less). Here, the 3.2 to 6.5 range color difference ΔE is called "class B tolerance," and is a range in which the colors seem to be the same at the impression level. Moreover, the color difference ΔE between the region A and the region B is more preferably within a range of 1.6 to 3.2, or under this range (ΔE is 3.2 or less). Here, the 1.6 to 3.2 range color difference ΔE is called "class A tolerance," is a color difference that is hardly perceivable in a color separation comparison, and is more preferable because, at this color difference, the colors are generally considered to be the same color. In addition, the color difference ΔE is even more preferably within a range of 0.8 to 1.6 or under this range. Here, the 0.8 to 1.6 range color difference ΔE is called "class AA tolerance," and is even more preferable because only a slight color difference can be perceived in a side-by-side color comparison.

As described later, the height to which the thermally expansive layer 22 rises differs depending on the amount of the thermal conversion material included in the thermal conversion layer. As such, when using ink to form the thermal conversion layer, the ink is printed at various densities in accordance with the height to which the thermally expansive layer 22 is to rise. In this case, for thermal conversion layers formed at all densities, it is preferable that the color difference be within or below the numerical value ranges described above. However, thermal conversion layers printed at specific densities or lower (for example, 80% or lower, or 70% or lower) may be considered to satisfy the color difference criterion described above.

In an example of a case in which the thermal conversion layer is formed using a foamable ink that contains cesium tungsten oxide as the thermal conversion material, as depicted by the distribution of absorption rates illustrated in FIG. 2, the cesium tungsten oxide exhibits a blue color. As such, while dependent on the amount of cesium tungsten oxide in the thermal conversion layer, the thermal conversion layer exhibits a bluish color. In this case, the color adjustment layer 23 includes a color adjusting agent containing a blue colorant (dye or pigment) that exhibits a color similar to the thermal conversion layer. Specifically, in terms of cyan (C), magenta (M), yellow (Y), and black (K), the color of cyan (C) appears more prominently than the other colors. Accordingly, it is preferable that a cyan-based colorant be used as the color adjusting agent. Note that, the color adjusting agent is not limited to one type and a plurality of types of color adjusting agents may be used simultaneously.

As an example, an ink was prepared by mixing, with respect to the total weight, 10 wt % of cesium tungsten oxide into an ultraviolet curable white ink. Using a brush, this ink was applied one time on a thermally expansive layer that includes a base and a thermally expansive layer. Thus, an ink layer (thermal conversion layer) was formed. The density of each of the CMKY colors of the ink layer was measured using an eXact reflection spectral densitometer (manufactured by Sakata INX ENG. Co., Ltd.). The density of cyan (C) was 0.03, the density of magenta (M) was 0.01, the density of yellow (Y) was 0.01, and the density of black (K) was 0.02. Thus, in the case of this example, a cyan-based colorant with particularly strong coloration may be used as the color adjusting agent of the color adjustment layer 23. Furthermore, in addition to cyan, one or all of yellow, magenta, and black colorants may be mixed into the color adjustment layer 23. The ratios at which these colorants are mixed in may be adjusted to obtain a color that is similar to the color of the ink layer 30 (the thermal conversion layer).

As described later, the color adjustment layer 23 may be formed using a printing device such as an offset printing device. In this case, an ink for forming the color adjustment layer 23 that includes the color adjusting agent may be prepared and used. Additionally, the color adjustment layer may be formed by setting the CMKY values of the color adjustment layer 23 and using offset printing color ink (CMKY) that is commonly used. Note that, provided that the color difference between the region A and the region B illustrated in FIG. 3A is reduced compared to the color difference in conventional examples, the coloration of the color adjustment layer can be set as desired and may be the same as or different from the coloration of the thermal conversion layer. Thus, in cases in which the color adjusting agent is formed using CMKY ink, the number of colors of ink that is used may be set as desired. For example, one color, which is similar to the color of the thermal conversion layer, may be used, or two or more colors may be used. In an example of the cesium tungsten oxide described above, the color adjustment layer 23 may be formed using an ink in which cyan appears more prominently than the other colors. Alternatively, the color adjustment layer 23 may be formed using an ink in which one or all of magenta, yellow, and black are used.

In cases in which the thermal conversion layer is formed using a foamable ink that contains LaB6 as the infrared absorbing agent, the LaB6 exhibits a greenish-blue color as depicted by the distribution of absorption rates illustrated in FIG. 2. As such, the thermal conversion layer also exhibits a greenish-blue color. In this case, the color adjustment layer 23 includes a color adjusting agent that exhibits a color similar to the thermal conversion layer. For example, in terms of cyan (C), magenta (M), yellow (Y), and black (K), the colors of yellow (Y) and cyan (C) appear more prominently than the other colors in the ink that uses LaB6. Thus, for example, the color adjustment layer 23 is formed using an ink that contains a yellow-based colorant and/or a cyan-based colorant (dyes or pigments). The color adjusting agent is not limited to only one type and a plurality of types of color adjusting agents may be used simultaneously. Additionally, a plurality of types of ink may be used to form the color adjustment layer 23, and the color adjustment layer 23 may be colored green. In this case as well, the color adjustment layer 23 can be formed using a desired printing device, as described above.

Thus, with the thermally expandable sheet 11 according to the present embodiment, the color adjustment layer 23 is provided and, as a result, the color difference between the thermally expandable sheet 11 and the ink layer 30 (corresponds to the front side conversion layer 81) provided on the front side of the thermally expandable sheet 11 can be reduced compared to the color difference in conventional configurations that do not include the color adjustment layer 23.

Production Method of Thermally Expandable Sheet

Next, a production method of the thermally expandable sheet 11 will be described using FIGS. 4A to 4C.

Figure 4A:
FIGS. 4A to 4C are cross-sectional views schematically explaining a production method of the thermally expandable sheet according to Embodiment 1.
Figure 4B:
Figure 4C:
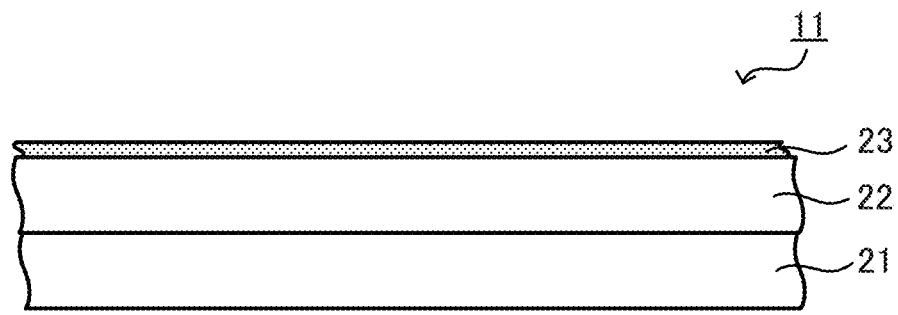

First, the base 21 is prepared (FIG. 4A). For example, a roll of paper is used as the base 21. However, the form of the paper is not limited to a roll in the production method described hereinafter, and individual sheets may be used.

Next, using the binder that includes the thermoplastic resin and the like and the thermally expandable material (the thermally expandable microcapsules), a known dispersing device or the like is used to prepare a coating liquid for forming the thermally expansive layer 22. Then, using a known coating device such as a bar coater, a roll coater, or a spray coater, the coating liquid is applied on a first side of the base 21. Next, the coated film is dried and, as illustrated in FIG. 4B, the thermally expansive layer 22 is formed. Note that, the application and the drying of the coating liquid may be carried out a plurality of times in order to obtain the target thickness of the thermally expansive layer 22. Additionally, the thermally expansive layer 22 may be formed by a different method.

Next, the color adjustment layer 23 is formed on the thermally expansive layer 22 using a known printing device for offset printing, flexographic printing, screen printing, gravure printing, or the like. The material that is used as the color adjusting agent, the concentration at which the adjusting agent is added, and the like are determined from the material of the infrared absorbing agent to be used in the foamable ink and the density at which the foamable ink is to be printed.

Figure 5:
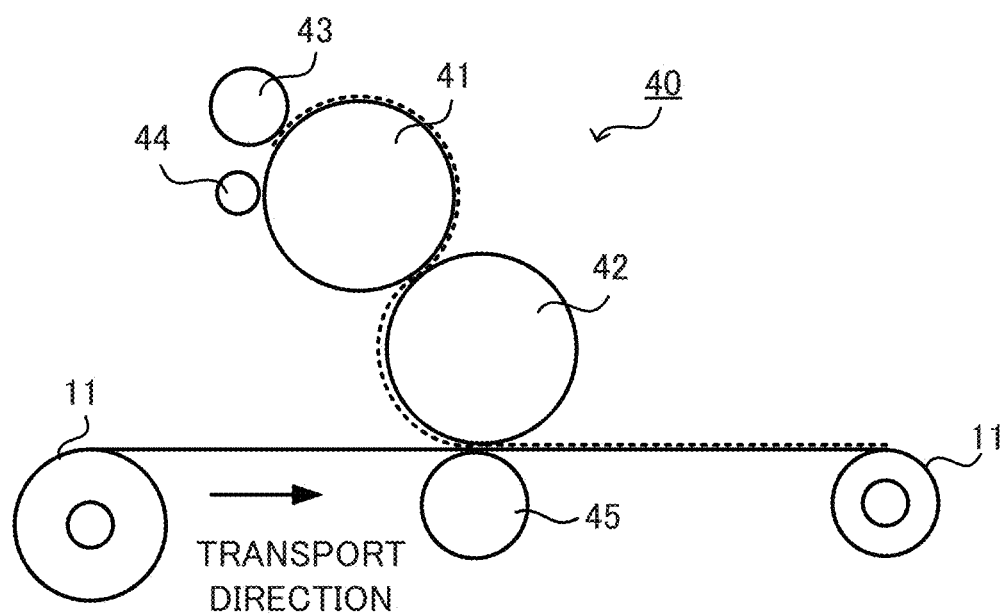
FIG. 5 is a drawing explaining an offset printing device.

In an example in which offset printing is used, as illustrated in FIG. 5, an offset printing device 40 includes a plate cylinder 41, a blanket 42, an ink roller 43, a water roller 44, and an impression cylinder 45.

The plate cylinder 41 includes a press plate. An image area and a non-image area are provided on the front side of the press plate. The image area is lipophilic (water repellent), and the non-image area is hydrophilic. In one example, the image area and the non-image are formed using photo-lithography. Specifically, a lipophilic photosensitive layer is provided on a hydrophilic support member, and the photosensitive layer is exposed via a mask (negative film) through which only the image area is exposed. Next, the photosensitive layer of the non-image area is removed, thereby leaving only the lipophilic photosensitive layer on the image area. Note that, any press plate production method may be used, and it is possible to use a laser or the like to burn an image to be printed directly on the press plate, without using a film.

Dampening water is supplied to the plate cylinder 41 by the water roller 44. The dampening water lands only on the (hydrophilic) non-image area of the press plate on the plate cylinder. Ink is supplied to the plate cylinder 41 by the ink roller 43. The ink does not land on the non-image area where the water is present. The ink adheres only on the (lipophilic) image area of the press plate.

In one example, the blanket 42 is formed from a rubber cylinder. The ink adhered to the plate cylinder 41 is transferred to the blanket 42. The impression cylinder 45 is disposed at a position facing the blanket 42. The blanket 42 contacts the front side of the thermally expandable sheet 11, thereby transferring the ink of the blanket 42 to the thermally expandable sheet 11.

Specifically, the values of the cyan (C), magenta (M), yellow (Y), and black (K) colors are determined in advance, as adjustment image data, on the basis of the color of the foamable ink. The printing device includes offset printing devices 40 that correspond to cyan (C), magenta (M), yellow (Y), and black (K). Each of the cyan (C), magenta (M), yellow (Y), and black (K) offset printing devices 40 prints a cyan (C), magenta (M), yellow (Y), and black (K) image on the front side of the thermally expandable sheet 11 in accordance with the designated adjustment image data. As a result, the color adjustment layer 23 is formed on the front side of the thermally expandable sheet 11, as illustrated in FIG. 10A.

The color adjustment layer 23 is not limited to being formed by setting the values of the CMYK colors. For example, ink for forming the color adjustment layer 23 may be prepared using a colorant, and this ink may be used to form the color adjustment layer 23. One type of colorant may be used alone or a plurality of types of colorants may be used. In this case, the color adjustment layer 23 can be formed in a single printing.

Then, in cases in which the base 21 has a roll form, cutting is performed as desired. Thus, the thermally expandable sheet 11 is obtained.

The thermally expandable sheet 11 is produced by the steps described above.

Production Method of Shaped Object

Next, the drawings are used to describe a production method of a shaped object according to the present embodiment. In the present embodiment, a shaped object is produced on the front side of the thermally expandable sheet 11 by causing at least a portion of the thermally expansive layer 22 of the thermally expandable sheet 11 to distend. In the following production method of a shaped object, an example is described of a case in which a thermally expandable sheet 11 wound into a roll-like shape (roll-type) is used, but individual sheets of the thermally expandable sheet 11 may be used.

Figure 6:
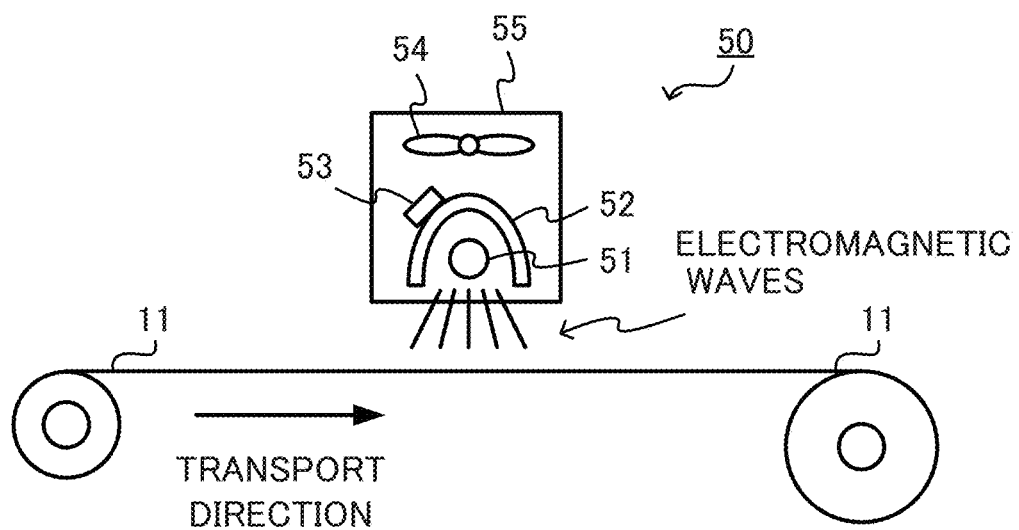
FIG. 6 is a drawing explaining an expansion device.
Figure 7:
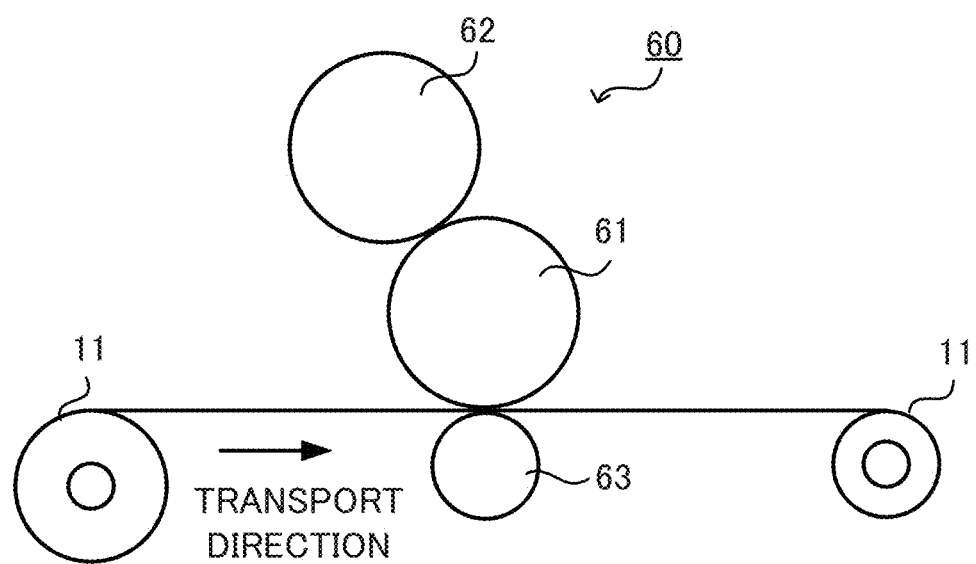
FIG. 7 is a drawing explaining a flexographic printing device.

The production method of a shaped object according to the present embodiment uses the offset printing device 40 illustrated in FIG. 5, an expansion device 50 illustrated in FIG. 6, and a flexographic printing device 60 illustrated in FIG. 7.

The expansion device 50 includes an irradiator 51, a reflection plate 52, a temperature sensor 53, and a cooler 54. The irradiator 51, the reflection plate 52, the temperature sensor 53, and the cooler 54 are housed in a housing 55. The thermally expandable sheet 11 is transported under the expansion device 50.

The irradiator 51 includes a lamp heater such as a halogen lamp. The irradiator 51 irradiates the thermally expandable sheet 11 with electromagnetic waves (light) in the near-infrared region (750 to 1400 nm wavelength range), the visible light spectrum (380 to 750 nm wavelength range), or the intermediate infrared region (1400 to 4000 nm wavelength range). When the thermally expandable sheet 11, on which the front side conversion layer 81 formed from the foamable ink that contains the thermal conversion material is printed, is irradiated with electromagnetic waves, the portions where the front side conversion layer 81 is printed convert the electromagnetic waves to heat more efficiently than the portions where the front side conversion layer 81 is not printed. As such, the portions of the thermally expandable sheet 11 where the front side conversion layer 81 is printed are mainly heated and, when the temperature at which expansion begins is reached, the thermally expandable material distends. Note that the irradiator 51 is not limited to a halogen lamp, and other configurations may be used, provided that it is possible to emit electromagnetic waves. Moreover, the wavelengths of the electromagnetic waves are not limited to the ranges described above.

The reflection plate 52 is an irradiation target that receives the electromagnetic waves emitted from the irradiator 51, and is a mechanism that reflects the electromagnetic waves emitted from the irradiator 51 toward the thermally expandable sheet 11. The reflection plate 52 is disposed so as to cover the top side of the irradiator 51, and reflects the electromagnetic waves irradiated upward from the irradiator 51 (the lamp heater) downward. Due to the reflection plate 52, the thermally expandable sheet 11 can be efficiently irradiated with the electromagnetic waves emitted from the lamp heater.

The temperature sensor 53 is a thermocouple, a thermistor or the like, and functions as a measuring device that measures the temperature of the reflection plate 52. The temperature sensor 53 measures the temperature of the reflection plate 52 while the irradiator 51 is emitting the electromagnetic waves. The reflection plate 52 receives the electromagnetic waves emitted from the irradiator 51. Therefore, the temperature of the reflection plate 52 changes depending on the intensity of the electromagnetic waves, that is, the magnitude of the energy of the electromagnetic waves emitted by the irradiator 51. As such, the temperature of the reflection plate 52 can be used as an indicator of the intensity of the electromagnetic waves being emitted by the irradiator 51.

The cooler 54 is provided above the reflection plate 52, and functions as a cooling device that cools the interior of the expansion device 50. The cooler 54 includes at least one ventilation fan, and cools the irradiator 51 by blowing air, from outside the expansion device 50, on the irradiator 51.

In the expansion device 50, the thermally expandable sheet 11 is pulled from the roll and is subjected to the electromagnetic waves emitted by the irradiator 51 while being transported by transport rollers (not illustrated in the drawings). As a result, the front side conversion layer 81 provided on the thermally expandable sheet 11 is heated. This heat is transmitted to the base 21 and the thermally expansive layer 22. At least a portion of the thermally expansive layer 22 distends. After the distension of the thermally expansive layer 22, the thermally expandable sheet 11 is wound up.

As illustrated in FIG. 7, the flexographic printing device 60 includes a plate cylinder 61 that includes a press plate formed from rubber or synthetic resin, an anilox roll 62, and an impression cylinder 63. The anilox roll 62 is a chrome-plated roll, a ceramic roll, or the like, and includes a plurality of cells (concavities) on the surface thereof. Ink is supplied to the anilox roll 62 by a known method such as a fountain roll or a doctor chamber. The ink that has entered the cells on the surface of the anilox roll 62 is transferred to the plate cylinder 61. Then, the print subject (the thermally expandable sheet 11) is transported between the plate cylinder 61 and the impression cylinder 63, and the ink is transferred to the thermally expandable sheet 11 between the plate cylinder 61 and the impression cylinder 63. Thus, printing is carried out.

In FIG. 7, an example is given of a single-color printing configuration, but the flexographic printing device 60 may be configured to perform multi-color printing. In this case, the flexographic printing device 60 includes a plate cylinder 61 and an anilox roll 62 for the ink of each color (for example, CMYK) that is to be used. Note that an impression cylinder 63 may be provided for each color that is to be used, or one impression cylinder 63 may be provided for a plurality of plate cylinders 61.

When printing the thermal conversion layer, in the flexographic printing device 60 illustrated in FIG. 7, the ink to be supplied to the anilox roll 62 is the foamable ink. In the present embodiment, the thermal conversion layer is caused to generate heat by emitting the electromagnetic waves. As such, when the black (K) ink for printing a color image contains carbon, the carbon may absorb the electromagnetic waves and generate heat. As such, it is preferable that the black (K) ink does not contain carbon.

Figure 8:
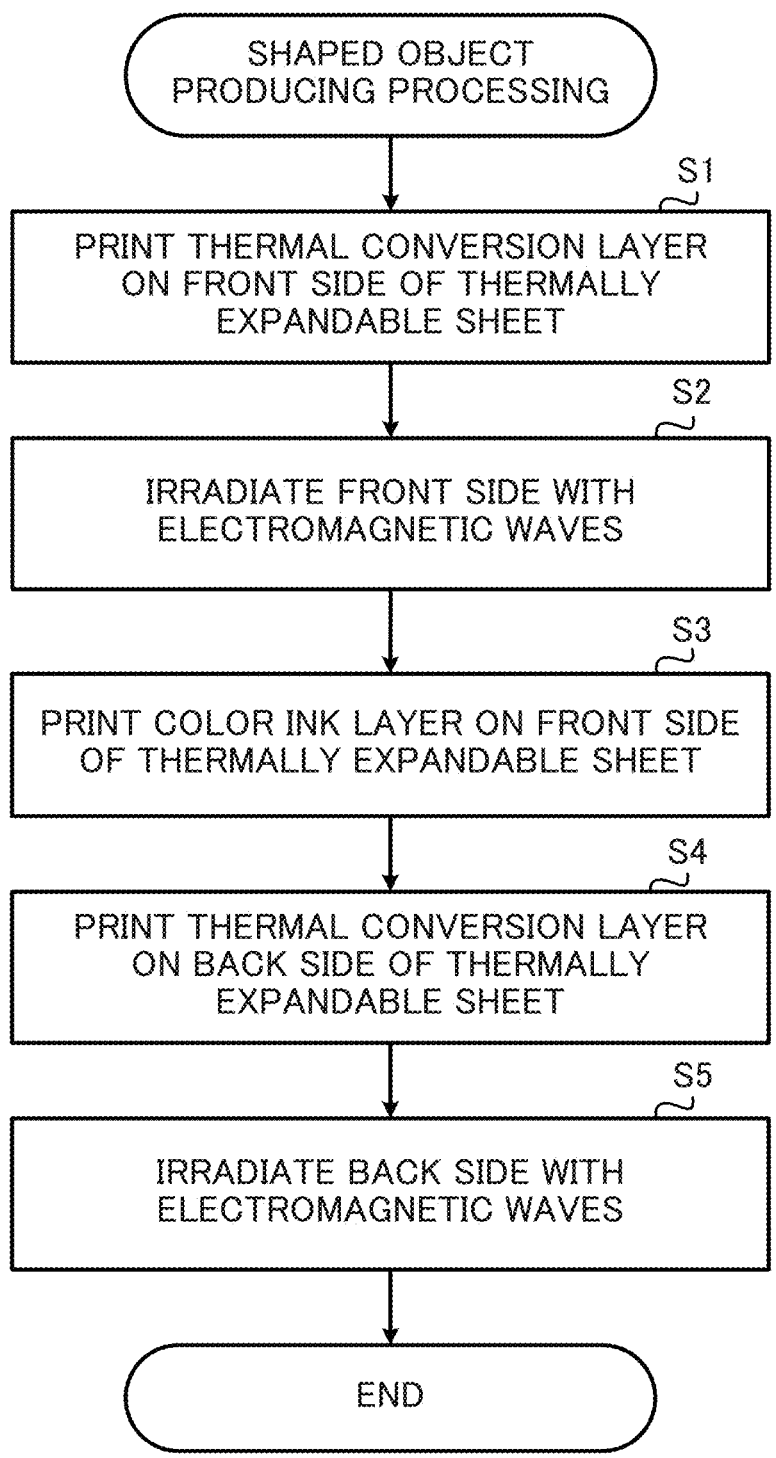
FIG. 8 is a flowchart illustrating shaped object production processing according to Embodiment 1.

Next, an explanation will be given of the flow of processing whereby a shaped object is formed on the thermally expandable sheet 11, while referencing the flowchart illustrated in FIG. 8, and the cross-sectional views of the thermally expandable sheet 11 illustrated in FIGS. 9A to 9E.

Figure 9A:
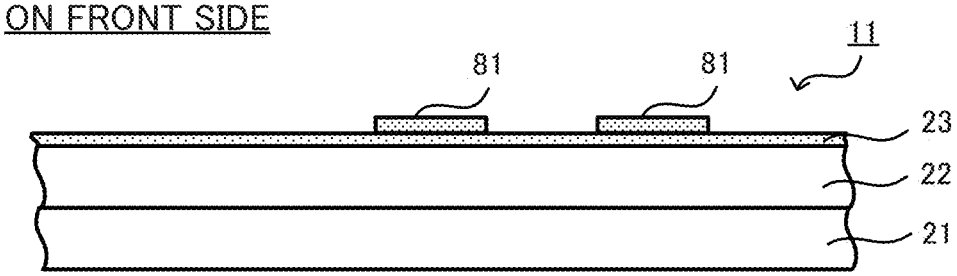
FIGS. 9A to 9E are cross-sectional views explaining the shaped object production processing according to Embodiment 1.

First, the thermally expandable sheet 11 is prepared. Color image data for forming the color ink layer 82, front side foaming data (corresponds to front side conversion layer 81) indicating the portion of the front side of the thermally expandable sheet 11 to foam and cause to distend, and back side foaming data (corresponds to the back side conversion layer 83) indicating the portion of the back side of the thermally expandable sheet 11 to foam and cause to distend are determined in advance. Next, using the offset printing device 40, the front side conversion layer 81 is printed on the front side of the thermally expandable sheet 11 (step S1). The front side conversion layer 81 is formed by a foamable ink that contains an electromagnetic wave thermal conversion material. The front side conversion layer 81 is formed by a foamable ink that contains, for example, cesium tungsten oxide or LaB6. The offset printing device 40 prints on the front side of the thermally expandable sheet 11 using the foamable ink. The printing is performed in accordance with the designated front side foaming data. As a result, the front side conversion layer 81 is formed on the front side of the thermally expandable sheet 11, as illustrated in FIG. 9A. Note that, when the front side conversion layer 81 is printed darker, the amount of generated heat increases and, as a result, the thermally expansive layer 22 rises higher. Accordingly, the deformation height of the thermally expansive layer 22 can be controlled by controlling the density of the front side conversion layer 81.

Figure 9B:
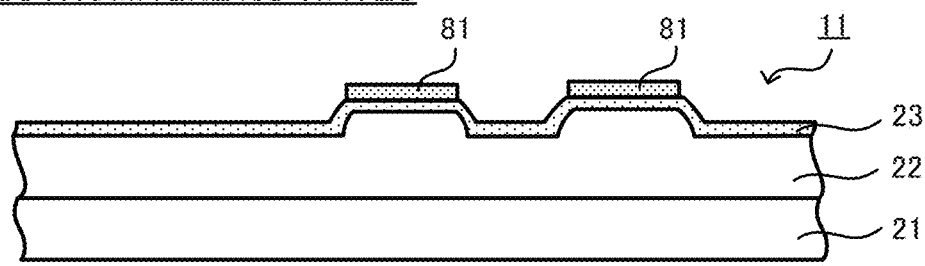

Second, the thermally expandable sheet 11 onto which the front side conversion layer 81 is printed is transported into the expansion device 50 such that the front side of the thermally expandable sheet 11 faces upward. In the expansion device 50, the transported thermally expandable sheet 11 is irradiated with electromagnetic waves by the irradiator 51 (step S2). Specifically, in the expansion device 50, the irradiator 51 irradiates the front side of the thermally expandable sheet 11 with electromagnetic waves. The thermal conversion material, included in the front side conversion layer 81 printed on the front side of the thermally expandable sheet 11, absorbs the irradiated electromagnetic waves, thereby generating heat. As a result, the front side conversion layer 81 generates heat, the generated heat is transmitted to the thermally expansive layer 22, and the thermally expansive material foams and distends. As a result, as illustrated in FIG. 9B, the region of the thermally expansive layer 22 of the thermally expandable sheet 11 where the front side conversion layer 81 is printed distends and rises.

Figure 9C:
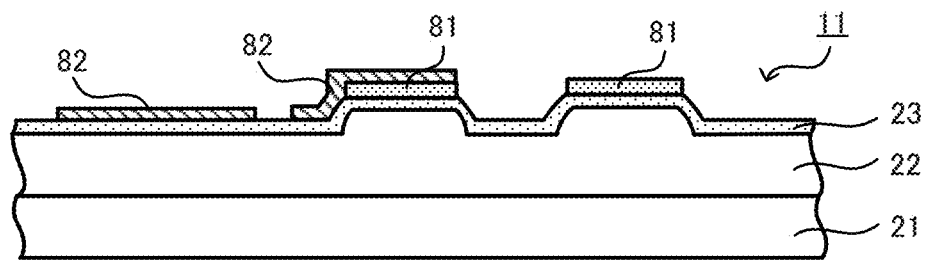

Third, the thermally expandable sheet 11 is transported to the flexographic printing device 60 with the front side of the thermally expandable sheet 11 facing upward and, using the thermally flexographic printing device 60, a color image (the color ink layer 82) is printed on the front side of the thermally expandable sheet 11 (step S3). In the present embodiment, at least a portion of the thermally expansive layer 22 distends and a raised portion is formed at the stage of the color printing. The type of printing device that is used is determined on the basis of the shape of this raised portion. Specifically, the flexographic printing device 60 includes plate cylinders, anilox rolls, and the like that correspond to cyan (C), magenta (M), yellow (Y), and black (K). The flexographic printing device 60 prints cyan (C), magenta (M), yellow (Y), and black (K) images on the front side of the thermally expandable sheet 11 in accordance with the designated color image data. As a result, the color ink layer 82 is formed, as illustrated in FIG. 9C.

Figure 9D:
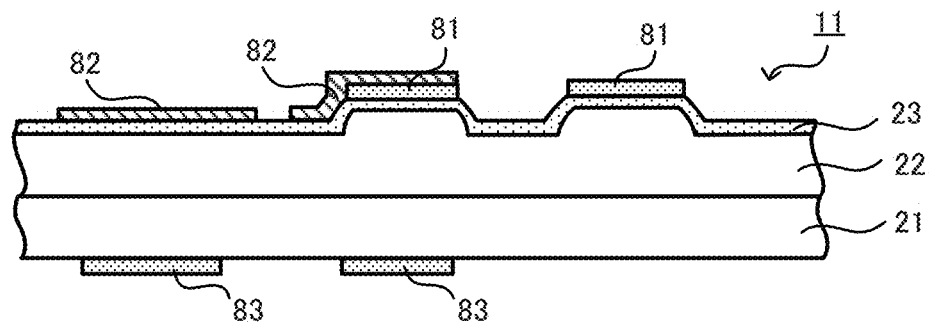

Fourth, using the flexographic printing device 60, the back side conversion layer 83 is printed on the back side of the thermally expandable sheet 11 (step S4). The back side conversion layer 83 is formed using a foamable ink that contains an electromagnetic wave thermal conversion material. The flexographic printing device 60 prints on the back side of the thermally expandable sheet 11 in accordance with the designated foaming data. As a result, the back side conversion layer 83 is formed on the back side of the thermally expandable sheet 11, as illustrated in FIG. 9D. In cases in which the back side conversion layer 83 is printed, an appropriate printing device is selected in accordance with the irregular shape of the sheet. Since the amount of generated heat increases when the back side conversion layer 83 is printed darker, the deformation height can be controlled by controlling the density of the back side conversion layer 83.

Figure 9E:
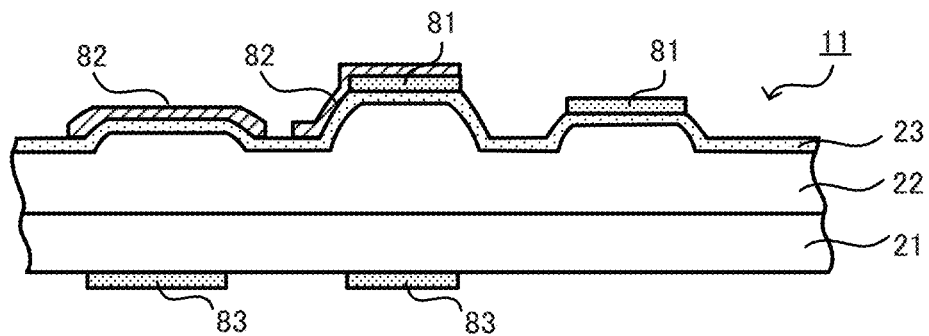

Fifth, the thermally expandable sheet 11 onto which the back side conversion layer 83 is printed is transported to the expansion device 50 such that the back side of the thermally expandable sheet 11 faces upward. In the expansion device 50, the transported thermally expandable sheet 11 is irradiated with electromagnetic waves by the irradiator 51 (step S5). Specifically, in the expansion device 50, the irradiator 51 irradiates the back side of the thermally expandable sheet 11 with electromagnetic waves. The thermal conversion material absorbs the irradiated electromagnetic waves, thereby generating heat. Note that the thermal conversion material is included in the back side conversion layer 83 printed on the back side of the thermally expandable sheet 11. As a result, the back side conversion layer 43 generates heat. Furthermore, the heat generated by the back side conversion layer 83 is transmitted to the thermally expansive layer 22, and the thermally expansive material foams and distends. As a result, as illustrated in FIG. 9E, the region of the thermally expansive layer 22 of the thermally expandable sheet 11 where the back side conversion layer 83 is printed distends and rises.

The shaped object is formed using the thermally expandable sheet 11 as a result of carrying out the procedures described above.

In the present embodiment, by controlling the densities of the images (the front side foaming data and the back side foaming data), controlling the electromagnetic waves, and the like, the amount of distension of the thermally expandable material can be controlled, the height to which the thermally expansive layer 22 rises can be controlled, and the front side of the thermally expandable sheet 11 can be caused to rise to a desired shape. Here, the phrase "controlling the electromagnetic waves" refers to controlling, in order to cause the thermally expandable sheet 11 to rise to a desired height, the amount of energy that the thermally expandable sheet 11 receives per unit area when causing the thermally expandable sheet 11 to distend in the expansion device 50 by irradiating the thermally expandable sheet 11 with the electromagnetic waves.

In the present embodiment, the color adjustment layer 23 is provided and, as a result, the color difference between the thermally expandable sheet 11 and the front side conversion layer 81 provided on the front side of the thermally expandable sheet 11 can be reduced compared to the color difference in conventional configurations that do not include the color adjustment layer 23. As a result, the front side conversion layer 81 can be made less conspicuous, and the impact of the color of the front side conversion layer 81 on the appearance of the shaped object formed on the thermally expandable sheet 11 can be reduced.

Embodiment 2

Hereinafter, the drawings are used to describe a thermally expandable sheet 12 according to Embodiment 2. The thermally expandable sheet 12 according to the present embodiment differs from the thermally expandable sheet 11 described in Embodiment 1 in that the thermally expandable sheet 12 includes a second color adjustment layer 24 on the underside of the base 21.

Thermally Expandable Sheet 12

Figure 10:
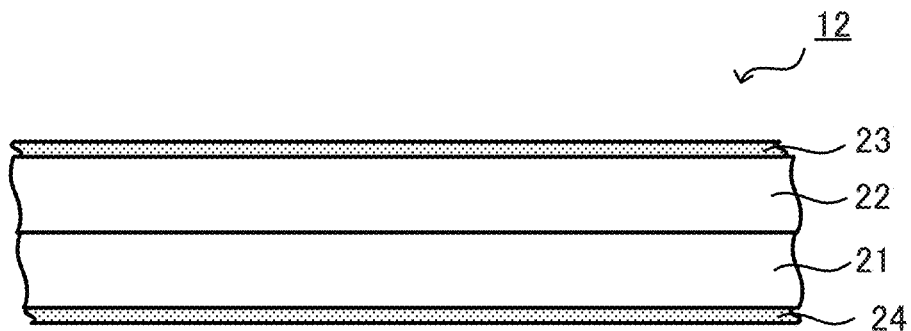
FIG. 10 is a cross-sectional view schematically illustrating a thermally expandable sheet according to Embodiment 2.

As schematically illustrated in FIG. 10, the thermally expandable sheet 12 includes a base 21, a thermally expansive layer 22, a color adjustment layer 23, and a second color adjustment layer 24.

As illustrated in FIG. 10, the second color adjustment layer 24 is provided on the underside of the base 21. The second color adjustment layer 24 is the same as the color adjustment layer 23, and contains a color adjusting agent. The color adjusting agent is a material that exhibits a color. The color adjusting agent includes a colorant (dye, pigment) and the like. The second color adjustment layer 24 is colored by the color adjusting agent. The second color adjustment layer 24 is the same as the color adjusting layer (the first color adjustment layer) 23, and has a function of reducing a visual difference between the second color adjustment layer 23 and the back side conversion layer 83 formed on the underside of the base 21. To accomplish this, the second color adjustment layer 24 is colored with a color that is similar to the color of the back side conversion layer 83. The second color adjustment layer 24 is provided over the entire back side of the base 21. Note that it is sufficient that the second color adjustment layer 24 be provided in a region on the underside of the base 21 where printing may be performed, and need not be formed in regions where printing will not be performed, such as in the margins.

Like the color adjustment layer 23, the color of the second color adjustment layer 24 is similar to the color of the back side conversion layer 83. By providing the second color adjustment layer 24, the color difference between the back side of the thermally expandable sheet 12 and the back side conversion layer 83 can be reduced. Specifically, the same comparison as discussed in Embodiment 1 is carried out for the underside of the thermally expandable sheet 12 (underside of the base 21), like in FIGS. 3A and 3B. That is, the color difference between the color of the second color adjustment layer 24 (corresponds to the region where the back side conversion layer 83 is not provided) and the back side conversion layer 83 is compared to the color difference between the underside of the base 21 where the second color adjustment layer 24 is provided (corresponds to the region B' illustrated in FIG. 3B) and the color of the back side conversion layer 83. Note that, in this case, the back side conversion layer 83 is provided directly on the underside of the base 21. The color difference between the color of the second color adjustment layer 24 and the back side conversion layer 83 is reduced compared to the color difference between the underside of the base 21 and the back side conversion layer 83 provided on the base 21. Thus, the back side conversion layer 43, made from the foamable ink, on the back side of the thermally expandable sheet 12 can be made less conspicuous.

In the present embodiment as well, the L*a*b* color system (Lab color system) can be used for the color difference. Specifically, the color difference ΔE between the region where the back side conversion layer 83 is formed and the region where the back side conversion layer 83 is not provided is reduced compared to the color difference ΔE in conventional configurations that do not include the second color adjustment layer 24 (corresponds to cases in which the back side conversion layer 83 is formed on the underside of the base 21). While it is sufficient that the color difference ΔE is less than in conventional examples, the color difference ΔE is preferably 13.0 or less, and more preferably 6.5 or less. The color difference ΔE is yet more preferably 3.2 or less and yet even more preferably 1.6 or less.

Production Method of Thermally Expandable Sheet 12

Next, a production method of the thermally expandable sheet 12 will be described using FIGS. 11A to 11C.

Figure 11A:
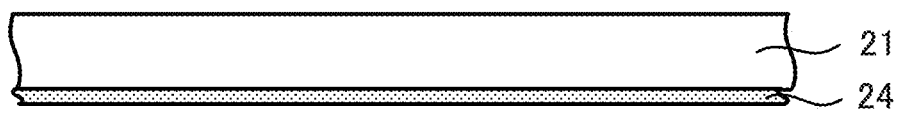
FIGS. 11A to 11C are cross-sectional views schematically explaining a production method of the thermally expandable sheet according to Embodiment 2.
Figure 11B:
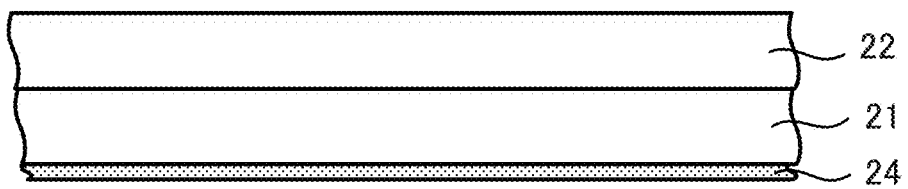

First, the base 21 is prepared (FIG. 11A). For example, a roll of paper is used as the base 21. However, the form of the paper is not limited to a roll in the production method described hereinafter, and individual sheets may be used.

Next, the second color adjustment layer 24 is formed on the back side of the base 21 (corresponds to the underside illustrated in FIG. 11A) using a known printing device for offset printing, flexographic printing, screen printing, gravure printing, or the like. The material that is used as the color adjusting agent, the concentration at which the adjusting agent is added, and the like are determined from the material of the infrared absorbing agent to be used in the foamable ink and the density at which the foamable ink is to be printed.

Specifically, the values of the cyan (C), magenta (M), yellow (Y), and black (K) colors are determined in advance, on the basis of the color of the foamable ink, as adjustment image data that forms the second color adjustment layer 24. Of the cyan (C), magenta (M), yellow (Y), and black (K), one color that is similar to the color of the thermal conversion layer may be used, or two or three colors may be used. Using the offset printing device 40, at least one of the cyan (C), magenta (M), yellow (Y), or black (K) images is printed on the back side of the thermally expandable sheet 12 in accordance with the designated adjustment image data. As a result, the second color adjustment layer 24 is formed on the back side of the base 21, as illustrated in FIG. 11A. Note that ink prepared, using a colorant, for forming the second color adjustment layer 24 may be used to form the second color adjustment layer 24.

Figure 11C:
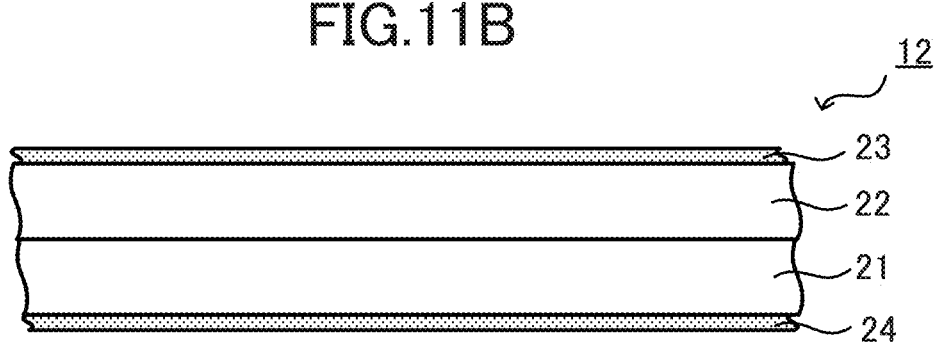

Next, as in Embodiment 1, the thermally expansive layer 22 is formed on the front side of the base 21 (the top surface illustrated in FIG. 11B), and the color adjustment layer 23 is formed on the thermally expansive layer 22 (FIG. 11C). In cases in which the base 21 has a roll form, cutting is performed as desired. Thus, the thermally expandable sheet 12 is obtained.

The thermally expandable sheet 12 is produced by the steps described above. In the present embodiment, a shaped object is formed on the thermally expandable sheet 12 in accordance with the same production method used in Embodiment 1.

In the present embodiment, the second color adjustment layer 24 is provided on the back side of the thermally expandable sheet 12. As such, the color difference between the thermally expandable sheet 12 and the back side conversion layer 83 provided on the back side of the thermally expandable sheet 12 can be reduced compared to the color difference in conventional configurations that do not include the second color adjustment layer 24. In particular, it is possible to obtain an advantageous effect of making the back side conversion layer 83 less conspicuous in cases in which a shaped object is formed on the thermally expandable sheet 12 and the back side of the thermally expandable sheet 12 is viewed.

In the embodiment described above, an example of a configuration is given in which the thermally expandable sheet 12 includes the color adjustment layer 23 and the second color adjustment layer 24. However, a configuration is possible in which the thermally expandable sheet 12 includes only the second color adjustment layer 24.

Embodiment 3

Hereinafter, the drawings are used to describe a thermally expandable sheet 13 according to Embodiment 3. The thermally expandable sheet 13 according to the present embodiment differs from the thermally expandable sheet 11 described in Embodiment 1 in that the thermally expansive layer 25 includes a color adjusting agent, and the thermally expansive layer 25 itself exhibits a color. Detailed descriptions of constituents that are the same as those described in Embodiment 1 are forgone.

Figure 12:
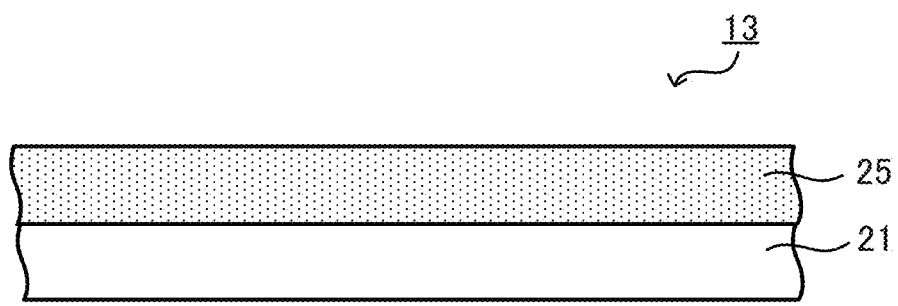
FIG. 12 is a cross-sectional view schematically illustrating a thermally expandable sheet according to Embodiment 3.

As illustrated in FIG. 12, the thermally expandable sheet 13 includes a base 21 and a thermally expansive layer 25. The base 21 of the present embodiment is the same as the base 21 described in Embodiment 1.

The thermally expansive layer 25 includes a binder and a thermally expandable material dispersed in the binder. The thermally expansive layer 25 is provided on the base 21. The binder and the thermally expandable material are the same as in Embodiment 1. In the present embodiment, the thermally expansive layer 25 further includes a color adjusting agent. As a result of this configuration, the thermally expansive layer 25 is colored. In the present embodiment, the thermally expansive layer 25 has the function of the color adjustment layer 23 of Embodiment 1.

Like the color adjustment layer 23 of Embodiment 1, the color of the thermally expansive layer 25 of the present embodiment is determined by the color of the front side conversion layer 81. As in FIGS. 3A and 3B, the colors of a region A (first region), where the front side conversion layer 81 is formed, and of a region B (second region), where the front side conversion layer 81 is not formed, are compared. Here, the color difference between these regions is reduced compared to the color difference between a thermally expansive layer and a front side conversion layer formed on this thermally expansive layer in a case in which a thermally expansive layer that has the same configuration as the thermally expansive layer 25 (with the exception of the color adjusting agent) and a front side conversion layer 81 provided on the thermally expansive layer 25 are formed. As a result of this configuration, the front side conversion layer 81 that is made from the foamable ink and is provided on the front side of the thermally expandable sheet 13 can be made less conspicuous.

As in Embodiment 1, Lab color system can be used for the color difference. Specifically, the color difference ΔE between the region where the front side conversion layer 81 is formed and the region where the front side conversion layer 81 is not provided is reduced compared to the color difference ΔE in conventional examples that do not include the thermally expansive layer 25 of the present embodiment. Here, the phrase "conventional examples that do not include the thermally expansive layer 25" corresponds to cases in which the thermally expansive layer 25 does not include the color adjusting agent. While it is sufficient that the color difference ΔE is less than in conventional examples, the color difference ΔE is preferably 13.0 or less, and more preferably 6.5 or less. The color difference ΔE is yet more preferably 3.2 or less and yet even more preferably 1.6 or less.

Production Method of Thermally Expandable Sheet 13

Next, a production method of the thermally expandable sheet 13 will be described using FIGS. 13A and 13B.

Figure 13A:
FIGS. 13A and 13B are cross-sectional views schematically explaining a production method of the thermally expandable sheet according to Embodiment 3.
Figure 13B:
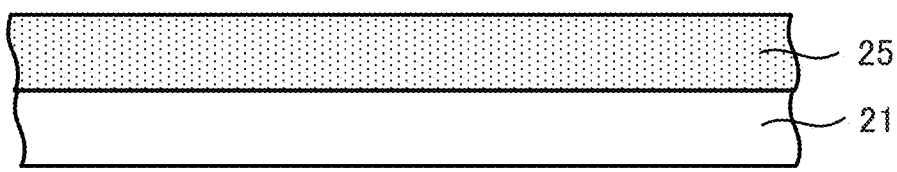

First, the base 21 is prepared (FIG. 13A). For example, a roll of paper is used as the base 21. However, the form of the paper is not limited to a roll in the production method described hereinafter, and individual sheets may be used.

Next, using the binder that includes the thermoplastic resin and the like and the thermally expandable material (the thermally expandable microcapsules), a known dispersing device or the like is used to prepare a coating liquid for forming the thermally expansive layer 25. In the present embodiment, the thermally expansive layer 25 is colored by mixing the color adjusting agent into the coating liquid. The material that is used as the color adjusting agent, the concentration at which the adjusting agent is added, and the like are determined from the material of the infrared absorbing agent to be used in the foamable ink and the density at which the foamable ink is to be printed.

Then, using a known coating device such as a bar coater, a roll coater, or a spray coater, the coating liquid is applied on a first side of the base 21. Next, the coated film is dried. Thus, the thermally expansive layer 25 is formed as illustrated in FIG. 13B. Note that the application and the drying of the coating liquid may be carried out a plurality of times in order to obtain the target thickness of the thermally expansive layer 25. Additionally, the thermally expansive layer 25 may be formed by a different method. In the present embodiment, the thermally expansive layer 25 includes the color adjusting agent and, as such, the step of forming the thermally expansive layer and the step of forming the color adjustment layer are performed at the same time.

Then, in cases in which the base 21 has a roll form, cutting is performed as desired. Thus, the thermally expandable sheet 13 is obtained. The thermally expandable sheet 13 is produced by the steps described above.

In the present embodiment as well, a shaped object is formed on the thermally expandable sheet 13 in accordance with the same production method of a shaped object described in Embodiment 1.

In the present embodiment, the function of the color adjustment layer 23 described in Embodiment 1 can be imparted to the thermally expansive layer 25 of the thermally expandable sheet 13, which can reduce a visual difference between the thermally expansive layer 25 and the front side conversion layer 81 provided on the thermally expansive layer 25. Additionally, the impact of the color of the front side conversion layer 81 on the appearance of the shaped object formed on the thermally expandable sheet 13 can be reduced.

Other Embodiments

The thermally expansive layer 25 is not limited to including only one layer and may include a plurality of layers. It is possible to impart the function of the color adjusting layer to one layer or a plurality of layers of the multiple layers. In such a case, it is preferable that the one layer or the plurality of layers positioned on the front side, which is easy to see, is colored. In other words, the one layer that is separated the farthest from the base 21 includes the colorant. Furthermore, the one layer or plurality of layers adjacent to this layer may also include a color adjusting agent.

Figure 14A:
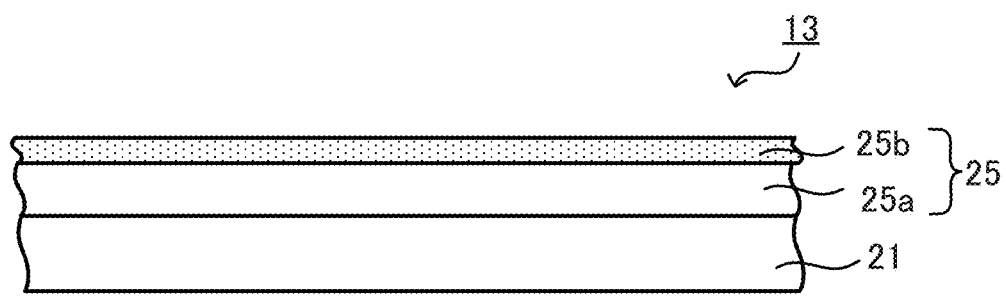
FIGS. 14A to 14C are cross-sectional views schematically illustrating thermally expandable sheets according to other embodiments.

In one example, as illustrated in FIG. 14A, the thermally expandable sheet 13 includes the base 21, and the thermally expansive layer 25. The thermally expansive layer 25 includes a layer 25*a* that is provided on the base 21, and a layer 25*b* provided on the layer 25*a*. In the thermally expansive layer of Modified Example 1, only the layer 25*b* includes the color adjusting agent, and only the layer 25*b* is colored. The thermally expansive layer 25 is formed as follows. To form the thermally expansive layer 25, a coating liquid that is free of the color adjusting agent and a coating liquid that includes the color adjusting agent are prepared as coating liquids for forming the thermally expansive layer 25. The layer 25*a* is formed by applying the coating liquid without the color adjusting agent to the base 21 and drying the coating liquid. Then, the layer 25*b* is formed by applying the coating liquid that includes the color adjusting agent to the layer 25*a* and drying the coating liquid. Thus, the thermally expansive layer 25 is formed.

A configuration is possible in which the ratio at which the thermally expandable material is dispersed in the binder varies among the plurality of layers of the thermally expansive layer 25. For example, regarding the layers 25*a* and 25*b* of the thermally expansive layer 25, the ratio at which the thermally expandable material is dispersed in the binder in the layer 25*a* may be less than the ratio at which the thermally expandable material is dispersed in the binder in the layer 25*b*.

In the thermally expansive layer 25, as illustrated in FIG. 14A, the layer 25*b* is positioned on the front side and is easy to see, and the layer 25*b* includes the colorant. As a result of this configuration, the front side conversion layer 81 is made less conspicuous by the layer 25a. In addition, the configuration eliminates the need to include the colorant in the layer 25a, which is near the base 21. Accordingly, unlike cases in which the colorant is included in the entire thermally expansive layer 25, it is possible to include the colorant only in the conspicuous portion. As a result, the added amount of the color adjusting agent in the entire thermally expansive layer 25 can be reduced. Moreover, an advantageous effect of preventing decreases in the mixing ratio of the thermally expandable material with respect to the binder that are caused by the color adjusting agent is obtained.

Figure 14B:
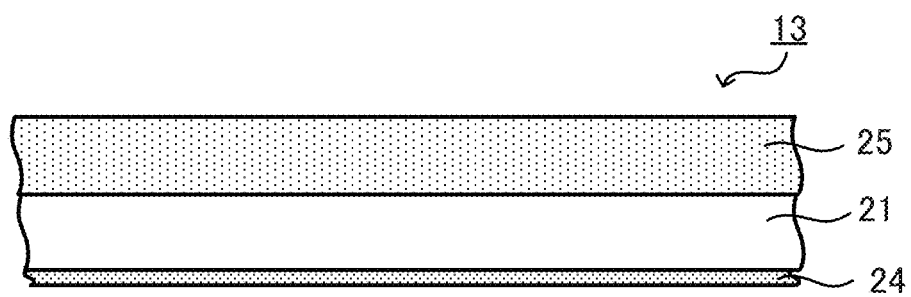

As illustrated in FIG. 14B, a configuration is possible in which the thermally expandable sheet 13 further includes a second color adjustment layer 24 such as that described in Embodiment 2. In this case, the thermally expandable sheet 13 includes the second color adjustment layer 24 on the underside of the base 21. The color, production method, and the like of the second color adjustment layer 24 are the same as in Embodiment 2.

Figure 14C:
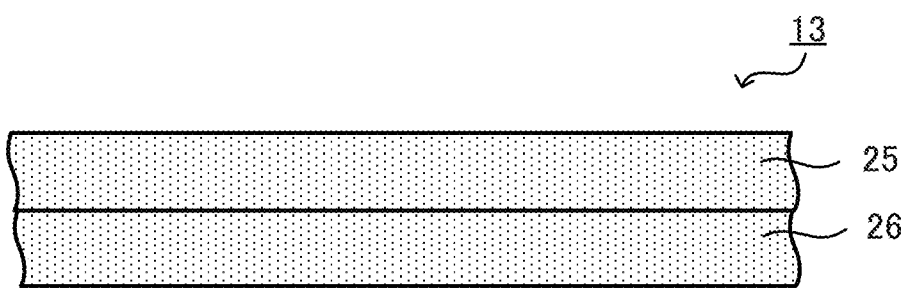

As illustrated in FIG. 14C, a configuration is possible in which, the thermally expandable sheet 13 includes a base 26 that is colored by the color adjusting agent. In this case, the base 26 has the function of the second color adjustment layer 24. For the color adjusting agent, the material that is used, the concentration at which the color adjusting agent is added, and the like are determined on the basis of the material of the infrared absorbing agent to be used in the foamable ink and the density at which the foamable ink is to be printed.

Note that, in the thermally expandable sheet 13 illustrated in FIG. 13C, the color adjusting agent included in the base 26 may be a colorant or a fluorescent brightener. In particular, when using paper as the base 26, the color adjusting agent may be a fluorescent brightener. Fluorescent brighteners are commonly added to paper to increase the whiteness of the paper. Fluorescent brighteners emit blue light and this blue light cancels out yellowing, thereby causing a whiter appearance. Moreover, the base 26 can be provided with a blue color by increasing the added ratio of this fluorescent brightener.

Embodiment 4

Hereinafter, the drawings are used to describe a thermally expandable sheet and a production method of a shaped object according to Embodiment 4. The thermally expandable sheet 14 used in the present embodiment differs from the thermally expandable sheet 11 and the like described in the preceding embodiments in that the color adjustment layer 23 is formed on the thermally expandable sheet 14 when forming the shaped object. Detailed descriptions of constituents that are the same as those described in the preceding embodiments are forgone.

Figure 15:
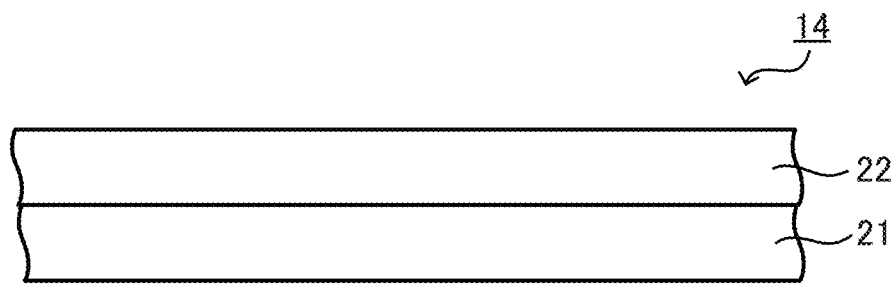
FIG. 15 is a cross-sectional view schematically illustrating a thermally expandable sheet according to Embodiment 4.

As illustrated in FIG. 15, the thermally expandable sheet 14 includes a base 21 and a thermally expansive layer 22. The base 21 and the thermally expansive layer 22 are the same as in Embodiment 1. As described below, a color adjustment layer 23 is formed on a surface (first side, first surface) of the front side of the thermally expandable sheet 14. The color adjustment layer 23 according to the present embodiment is the same as the color adjustment layer 23 of Embodiment 1. The color difference between the color adjustment layer 23 and the front side conversion layer 81 provided on the color adjustment layer 23 can be reduced compared to conventional configurations that do not include the color adjustment layer 23.

Production Method of Shaped Object

Figure 16:
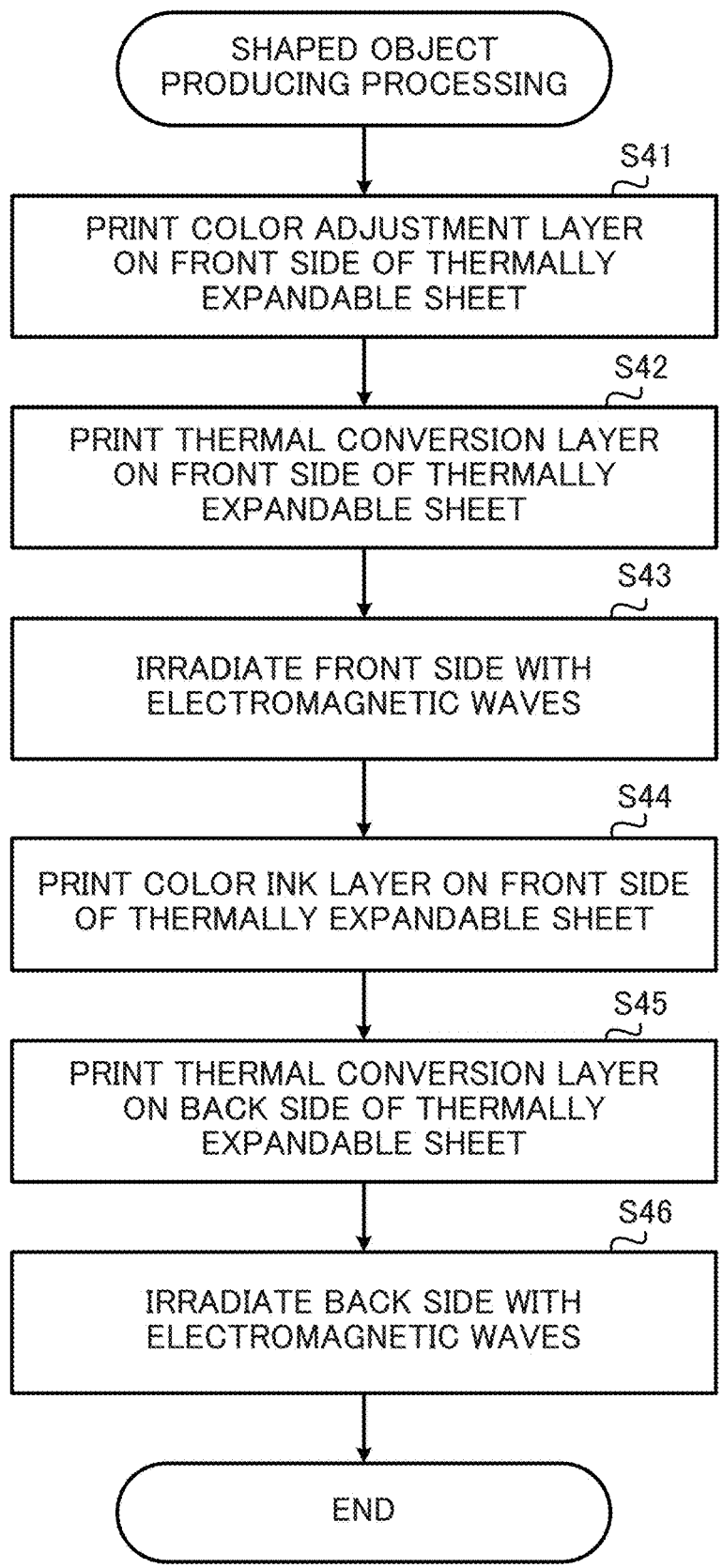
FIG. 16 is a flowchart illustrating shaped object production processing according to Embodiment 4.

Next, the flowchart illustrated in FIG. 16 is used to describe the production method of a shaped object according to the present embodiment.

First, the base 21 is prepared and the color adjustment layer 23 is formed on the thermally expansive layer 22 (step S41). Here, the adjustment image data for forming the color adjustment layer 23 is determined in advance, the same as in Embodiment 1. Color image data for forming the color ink layer 82, front side foaming data (corresponds to front side conversion layer 81) indicating the portion of the front side of the thermally expandable sheet 14 to foam and cause to distend, and foaming data (corresponds to the back side conversion layer 83) indicating the portion of the back side of the thermally expandable sheet 14 to foam and cause to distend are determined in advance. The thermally expandable sheet 14 is transported to the printing device with the front side of the thermally expandable sheet 14 facing upward. The color adjustment layer 23 is printed on the front side of the thermally expandable sheet 14. Any printing device may be used. Examples thereof include offset printing devices and the like. The region where the color adjustment layer 23 is printed may be determined as desired. For example, the color adjustment layer 23 may be printed so as to cover the entire thermally expansive layer 22, or may be printed on only a portion of the thermally expansive layer 22.

Specifically, the values of the cyan (C), magenta (M), yellow (Y), and black (K) colors are determined in advance as the adjustment image data. The offset printing device 40 prints cyan (C), magenta (M), yellow (Y), and black (K) images on the front side of the thermally expandable sheet 14 in accordance with the designated adjustment image data. As a result, the color adjustment layer 23 is formed on the front side of the thermally expandable sheet 14. Note that the ink for forming the color adjustment layer may be prepared using the colorant, and this ink may be used to form the color adjustment layer 23. In this case, the color adjustment layer 23 is formed in a single printing.

Second, using the offset printing device 40, the front side conversion layer 81 is printed on the front side of the thermally expandable sheet 14 (on the color adjustment layer 23) (step S42). The offset printing device 40 prints on the front side of the thermally expandable sheet 14 using the foamable ink. The printing is performed in accordance with the designated front side foaming data. As a result, the front side conversion layer 81 is formed on the front side of the thermally expandable sheet 14.

Third, the thermally expandable sheet 14 onto which the front side conversion layer 81 is printed is transported to the expansion device 50 such that the front side of the thermally expandable sheet 14 faces upward. In the expansion device 50, the transported thermally expandable sheet 14 is irradiated with electromagnetic waves by the irradiator 51 (step S43). As a result, the front side conversion layer 81 generates heat, the generated heat is transmitted to the thermally expansive layer 22, and the thermally expandable material foams and distends. As a result, the region of the thermally expansive layer 22 of the thermally expandable sheet 14 where the front side conversion layer 81 is printed distends and rises.

Fourth, the thermally expandable sheet 14 is transported to the flexographic printing device 60 with the front side of the thermally expandable sheet 14 facing upward, and a color image (the color ink layer 82) is printed on the front side of the thermally expandable sheet 14 (step S44). The flexographic printing device 60 prints cyan (C), magenta (M), yellow (Y), and black (K) images on the front side of the thermally expandable sheet 14 in accordance with the designated color image data. As a result, the color ink layer 82 is formed.

Fifth, using the flexographic printing device 60, the back side conversion layer 83 is printed on the back side of the thermally expandable sheet 14 (step S45). The flexographic printing device 60 prints on the back side of the thermally expandable sheet 14 in accordance with the designated foaming data. As a result, the back side conversion layer 83 is formed on the back side of the thermally expandable sheet 14.

Sixth, the thermally expandable sheet 14 onto which the back side conversion layer 83 is printed is transported to the expansion device 50 such that the back side of the thermally expandable sheet 14 faces upward. In the expansion device 50, the transported thermally expandable sheet 14 is irradiated with electromagnetic waves by the irradiator 51 (step S46). As a result, the heat generated by the back side conversion layer 83 is transmitted to the thermally expansive layer 22, and the thermally expandable material foams and distends. As a result, the region of the thermally expansive layer 22 of the thermally expandable sheet 14 where the back side conversion layer 83 is printed distends and rises.

A shaped object is formed using the thermally expandable sheet 14 as a result of carrying out the procedures described above.

According to the present embodiment, the color adjustment layer 23 is provided and, as a result, the color difference between the thermally expandable sheet 14 and the front side conversion layer 81 provided on the front side of the thermally expandable sheet 11 can be reduced compared to the color difference in conventional configurations that do not include the color adjustment layer 23. Additionally, the step of forming the color adjustment layer 23 can be performed when producing the shaped object. As such, it is possible to form the color adjustment layer 23 on conventional thermally expandable sheets that do not originally include the color adjustment layer 23. In particular, since the color adjusting layer is not formed in advance, it is possible to change the color of the color adjustment layer 23 depending on the shaped object to be formed on the thermally expandable sheet, the color of the thermal conversion layer to be formed, and the like.

In the production method of a shaped object described above, the order in which the steps are carried out is not limited to the order illustrated in the drawing. For example, a configuration is possible in which all of the color adjustment layer 23, the front side conversion layer 81, the color ink layer 82, and the back side conversion layer 83 are printed and, thereafter, the expansion steps (step S43 and S46) using the expansion device are performed.

Furthermore, a configuration is possible in which the second color adjustment layer 24 is formed on the back side of the thermally expandable sheet 12, as in the thermally expandable sheet 12 described in Embodiment 2. In this case, a step of forming the second color adjustment layer 24 on the surface (second side, second surface) of the back side of the thermally expandable sheet is added. The step of forming the second color adjustment layer 24 is performed the same as step S41. The timing at which the step of forming the second color adjustment layer 24 is performed may be determined as desired. For example, the step of forming the second color adjustment layer 24 may be performed before or after the step of forming the color adjustment layer 23 (step S41), or may be performed after the step of forming the front side conversion layer 81 (step S42).

Embodiment 5

Hereinafter, the drawings are used to describe a thermally expandable sheet, a production method of the thermally expandable sheet, and a production method of a shaped object according to Embodiment 5. The thermally expandable sheet 15 used in the present embodiment differs from the thermally expandable sheet 11 and the like described in the preceding embodiments in that the thermally expandable sheet 15 includes an ink receiving layer for receiving and fixing ink on the thermally expansive layer 22. Detailed descriptions of constituents that are the same as those described in the preceding embodiments are forgone.

Thermally Expandable Sheet 15

Figure 17:
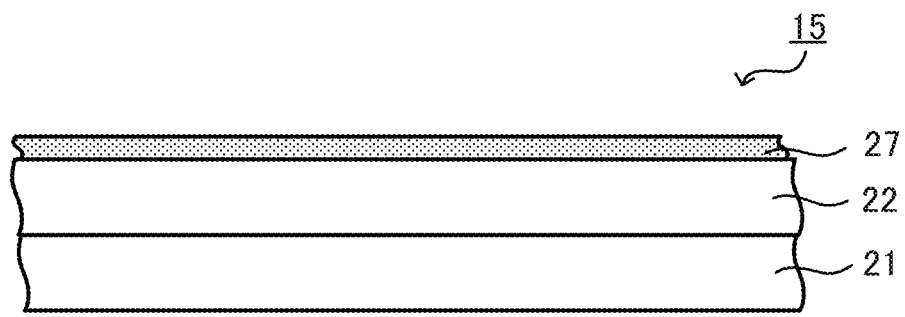
FIG. 17 is a cross-sectional view schematically illustrating a thermally expandable sheet according to Embodiment 5.

As illustrated in FIG. 17, the thermally expandable sheet 15 includes a base 21, a thermally expansive layer 22, and an ink receiving layer (first ink receiving layer) 27. The base 21 and the thermally expansive layer 22 are the same as in Embodiment 1.

The ink receiving layer (first ink receiving layer) 27 is formed on the thermally expansive layer 22. The ink receiving layer 27 receives and fixes the ink used in the printing steps. For example, the ink receiving layer 27 receives and fixes the water-based ink used by an ink jet printer. The ink receiving layer 27 is formed by a commonly used material, in accordance with the ink to be used in the printing steps. For layer types that use gaps to receive the ink, the ink receiving layer 27 is formed using porous silica, for example. For layer types that swell to receive the ink, the ink receiving layer 27 is formed using a resin selected from, for example, a polyvinyl alcohol (PVA) resin, a polyester resin, a polyurethane resin, an acrylic resin, and the like.

The ink receiving layer 27 of the present embodiment includes the color adjusting agent and fulfills the functions of the color adjustment layer 23 described in Embodiment 1 and the like. The material of the color adjusting agent, the ratio at which the color adjusting agent is added, and the like are the same as in the other embodiments, and are determined in accordance with the color of the thermal conversion layer. The ink receiving layer 27 in this case has the same function as the color adjustment layer 23 of Embodiment 1 and, compared to conventional configurations, can reduce the color difference between the ink receiving layer 27 and the front side conversion layer 81 provided on the ink receiving layer 27. In the present embodiment, "conventional configurations" corresponds to cases in which the front side conversion layer 81 is formed on an ink receiving layer 27 that does not include a color adjusting agent (on an ink receiving layer having the same configuration with the exception of the color adjusting agent).

Production Method of Thermally Expandable Sheet 15

Next, a production method of the thermally expandable sheet 15 will be described using FIGS. 18A and 18B.

Figure 18A:
FIGS. 18A and 18B are cross-sectional views schematically illustrating a production method of the thermally expandable sheet according to Embodiment 5.
Figure 18B:
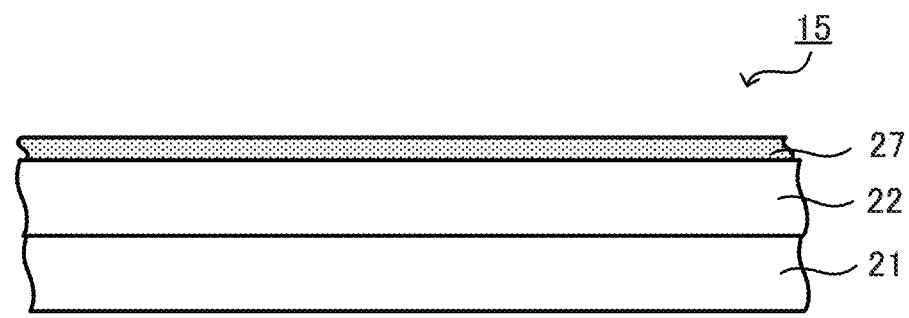

First, the base 21 is prepared the same as in Embodiment 1 and, as illustrated in FIG. 18A, the thermally expansive layer 22 is formed on the base 21.

Next, a coating liquid is prepared using the material of the ink receiving layer 27, such as porous silica. At this time, the color adjusting agent is added to the coating liquid. Then, using a known coating device of a system such as a bar coater, a roll coater, or a spray coater, this coating liquid is applied on the thermally expansive layer 22. Note that, the application and the drying of the coating liquid may be carried out a plurality of times in order to obtain the target thickness of the ink receiving layer 27. Next, the coated film is dried and, as illustrated in FIG. 18B, the ink receiving layer 27 is formed. In the present embodiment, the ink receiving layer 27 includes the color adjusting agent and, as such, the step of forming the ink receiving layer and the step of forming the color adjustment layer are performed at the same time.

Then, in cases in which the base 21 has a roll form, cutting is performed as desired. Thus, the thermally expandable sheet 15 is obtained. The thermally expandable sheet 15 is produced by the steps described above.

Shaping System

Figure 19A:
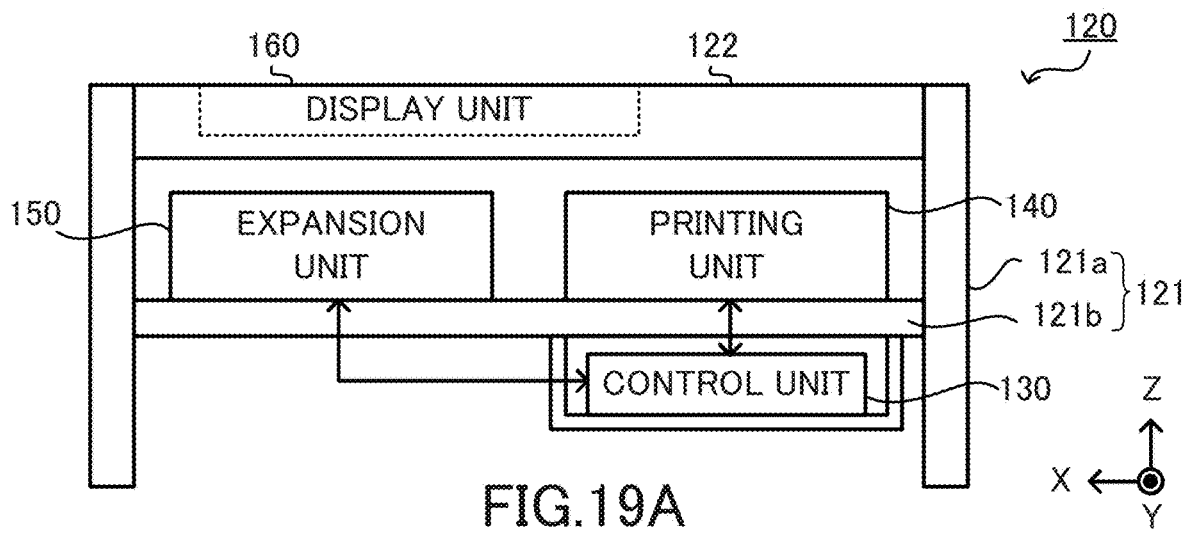
FIGS. 19A to 19C are drawings illustrating an overview of a shaping system according to Embodiment 5.
Figure 19B:
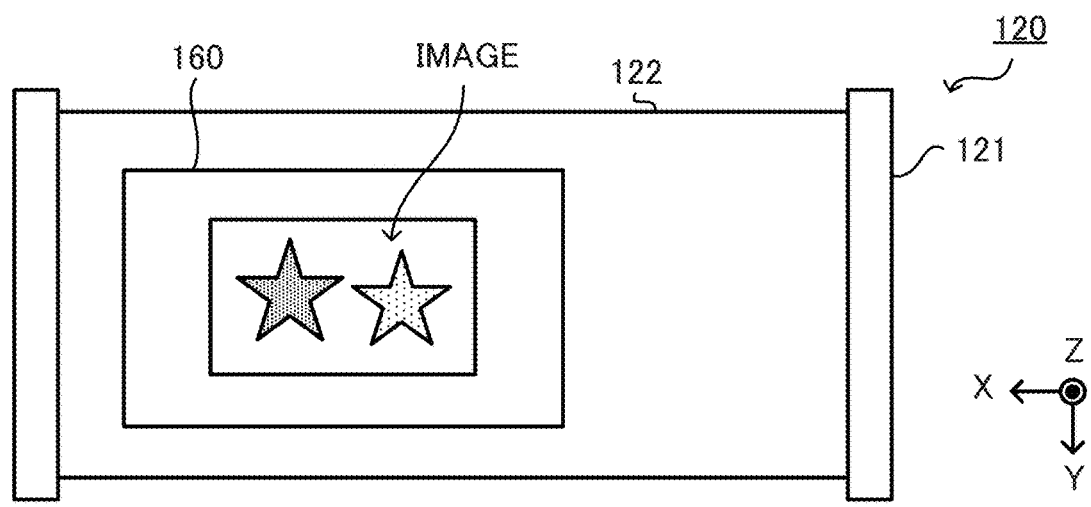
Figure 19C:
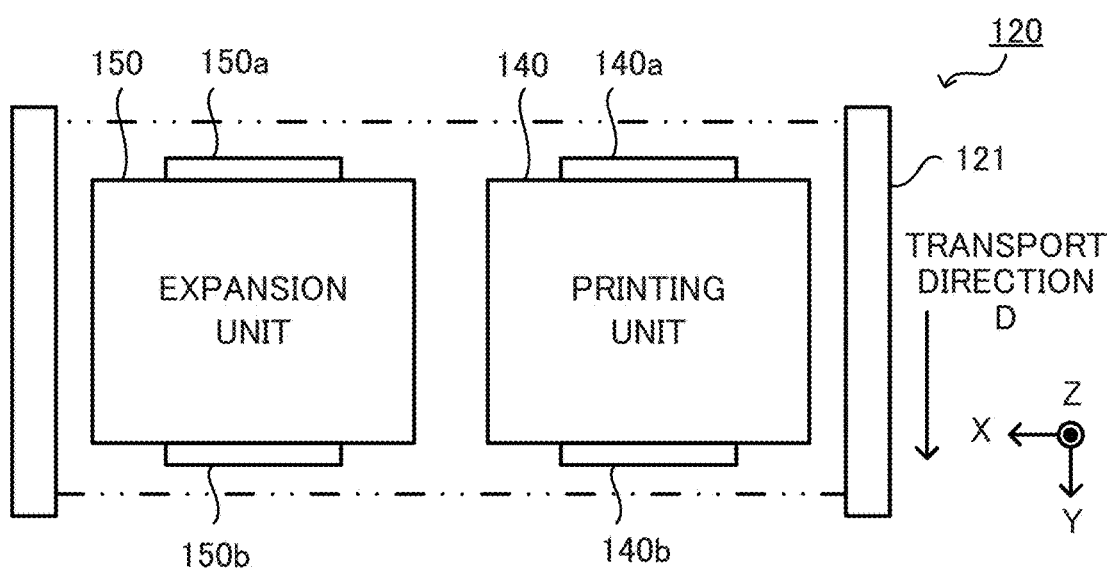

Next, while referencing FIGS. 19A to 19C, a description will be given of a shaping system 120 for shaping a shaped object on the thermally expandable sheet 15. FIGS. 19A to 19C illustrate a configuration example of the shaping system 120. FIG. 19A is a front view of the shaping system 120. FIG. 19B is a plan view of the shaping system 120 and depicts a state in which a top plate 122 is closed. FIG. 19C is a plan view of the shaping system 120 and depicts a state in which the top plate 122 is open. In FIGS. 19A to 19C, the X-direction corresponds to the direction in which the printing unit 140 and the expansion unit 150 are juxtaposed, the Y-direction corresponds to the transport direction of the thermally expandable sheet 15 in the printing unit 140 and the expansion unit 150, and the Z-direction corresponds to the vertical direction. The X-direction, the Y-direction, and the Z-direction are orthogonal to each other.

The shaping system 120 includes a control unit 130, a printing unit 140, an expansion unit 150, and a display unit 160. The control unit 130, the printing unit 140, and the expansion unit 150 are each mounted in the frame 121 as illustrated in FIG. 19A. Specifically, the frame 121 includes a pair of substantially rectangular sideboards 121a and a coupling beam 121b provided between the sideboards 121a. The top plate 122 spans between upper portions of the sideboards 121a. The printing unit 140 and the expansion unit 150 are juxtaposed in the X-direction on the coupling beam 121b that spans between the sideboards 121a, and the control unit 130 is fixed below the coupling beam 121b. The display unit 160 is embedded in the top plate 122 so as to be flush with the top surface of the top plate 122.

Control Unit

The control unit 130 controls the printing unit 140, the expansion unit 150, and the display unit 160. The control unit 130 supplies power to the printing unit 140, the expansion unit 150, and the display unit 160. The control unit 130 includes a controller that includes a central processing unit (CPU) or the like, a storage unit that includes flash memory of the like, a communicator, and a non-transitory recording medium driver (all not illustrated in the drawings). Each of these components is connected to a bus for transmitting signals.

Printing Unit

The printing unit 140 prints images on the front side and/or the back side of the thermally expandable sheet 15. In the present embodiment, the printing unit 140 is an ink jet printer that prints images via a method in which ink is micronized and directly sprayed on print media. Any desired ink can be used in the printing unit 140. For example, a water-based ink can be used in the printing unit 140.

As illustrated in FIG. 19C, the printing unit 140 includes a loader 140a for loading the thermally expandable sheet 15, and a discharger 140b for discharging the thermally expandable sheet 15. The printing unit 140 prints a designated image on the front side and/or the back side of the thermally expandable sheet 15 loaded through the loader 140a, and discharges the thermally expandable sheet 15 on which the image is printed through the discharger 140b.

The printing unit 140 acquires image data from the control unit 130 and executes printing on the basis of the acquired image data. Specifically, the printing unit 140 acquires, as the image data, the color image data, the front side foaming data, and the back side foaming data. The color image data is data that represents a color image to be printed on the front side of the thermally expandable sheet 15. The printing unit 140 causes a print head (not illustrated in the drawings) to spray cyan, magenta, and yellow inks toward the thermally expandable sheet 15 to print the color image.

The front side foaming data is data that indicates the portion of the front side of the thermally expandable sheet 15 to be foamed and caused to swell. The back side foaming data is data that indicates the portion of the back side of the thermally expandable sheet 15 to be foamed and caused to swell. The printing unit 140 causes the print head 42 to spray the foamable ink toward the thermally expandable sheet 15 to print a gray-scale image (gray-scale pattern) that corresponds to the front side foaming data or the back side foaming data.

Expansion Unit

The expansion unit 150 irradiates the front side and/or the back side of the thermally expandable sheet 15 with electromagnetic waves, thereby causing at least a portion of the thermally expansive layer to distend. As illustrated in FIG. 19C, the expansion unit 150 includes a loader 150a for loading the thermally expandable sheet 15, and a discharger 150b for discharging the thermally expandable sheet 15. The expansion unit 150 irradiates the front side and/or the back side of the thermally expandable sheet 15 loaded through the loader 150a with electromagnetic waves, thereby causing at least a portion of the thermally expansive layer to distend, and discharges the thermally expandable sheet 15 that includes the distended thermally expansive layer through the discharger 150b.

The expansion unit 150 includes a pair of transport rollers, a transport motor, and an irradiator (all not illustrated in the drawings). The irradiator is a mechanism that irradiates electromagnetic waves. The irradiator functions as an irradiation device that irradiates the thermally expandable sheet 15, transported by the pair of transport rollers, with electromagnetic waves. The irradiator includes a lamp heater, a reflection plate, a temperature sensor, and a cooler (all not illustrated in the drawings). The expansion unit 150 has the same configuration as the expansion device 50 illustrated in FIG. 6 and, as such, detailed description thereof is foregone.

The loader 150a is a mechanism for loading the thermally expandable sheet 15. In cases in which the front side of the thermally expandable sheet 15 is to be irradiated with electromagnetic waves and the front side of the thermally expandable sheet 15 is to be caused to distend, a user sets the thermally expandable sheet 15 in the loader 150a with the front side of the thermally expandable sheet 15 facing upward. Alternatively, in cases in which the back side of the thermally expandable sheet 15 is to be irradiated with electromagnetic waves and the back side of the thermally expandable sheet 15 is to be caused to distend, the user sets the thermally expandable sheet 15 in the loader 150a with the back side of the thermally expandable sheet 15 facing upward. The thermally expandable sheet 15 disposed in the loader 150a is transported into the housing by the pair of transport rollers while being guided by a transport guide (not illustrated in the drawings).

Display Unit

The display unit 160 includes a display device such as a liquid crystal display or an organic electro luminescence (EL) display, and a display driving circuit that causes images to be displayed on the display device. In the example illustrated in FIG. 19B, the display unit 160 displays an image (for example, the stars illustrated in FIG. 19B) to be printed on the thermally expandable sheet 15 by the printing unit 140. Additionally, as desired, the display unit 160 may display information indicating the current state of the printing unit 140 and/or the current state of the expansion unit 150.

While not illustrated in the drawings, the shaping system 120 may include an operation unit that is operated by a user. The operation unit includes buttons, switches, dials, and the like and receives operations for the printing unit 140 or the expansion unit 150. Alternatively, the display unit 160 may include a touch panel or a touch screen in which the display device and the operation device are stacked.

Production Method of Shaped Object

Figure 20:
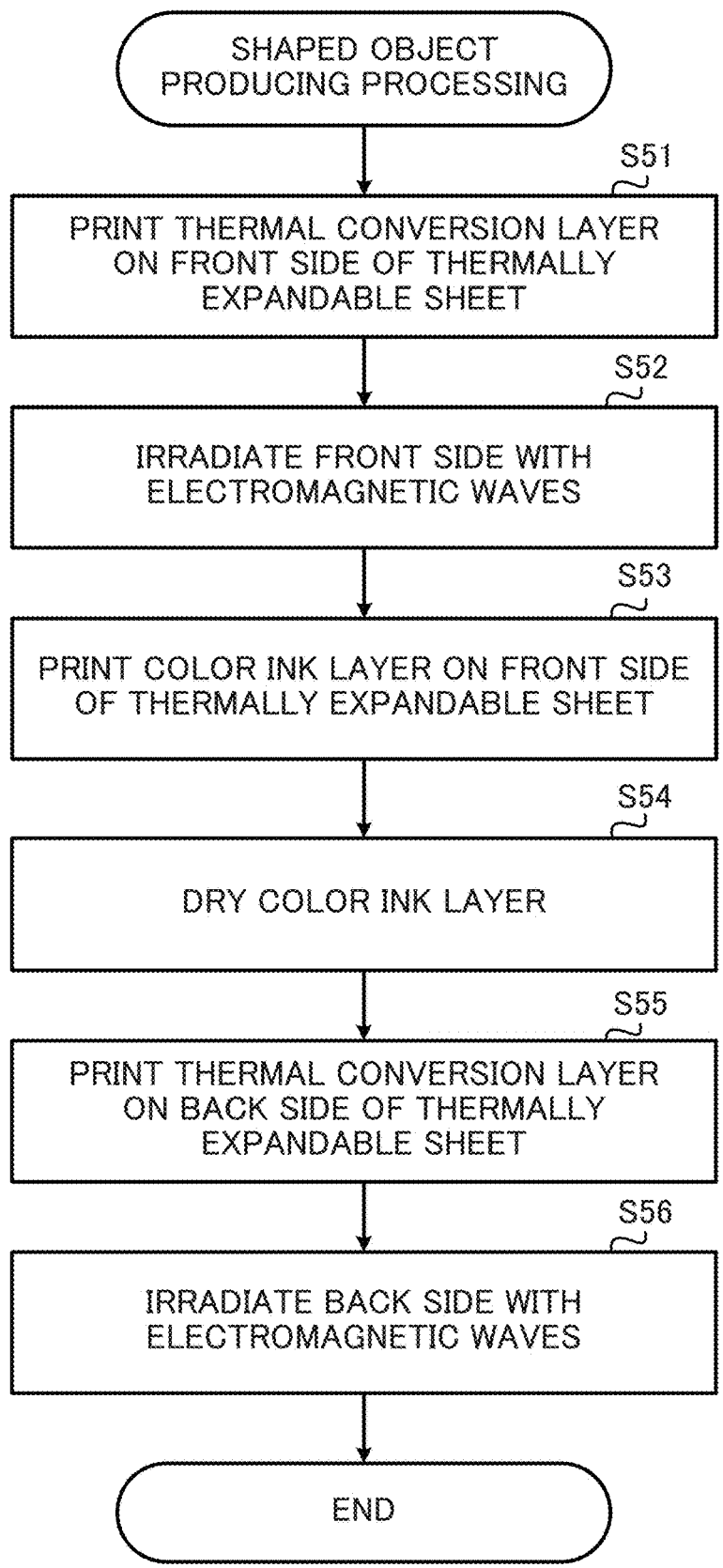
FIG. 20 is a flowchart illustrating shaped object production processing according to Embodiment 5.

Next, an explanation will be given of the flow of processing whereby a shaped object is produced by the shaping system 120 using the thermally expandable sheet 15, while referencing the flowchart illustrated in FIG. 20, and the cross-sectional views of the thermally expandable sheet 15 illustrated in FIGS. 21A to 21E.

Figure 21A:
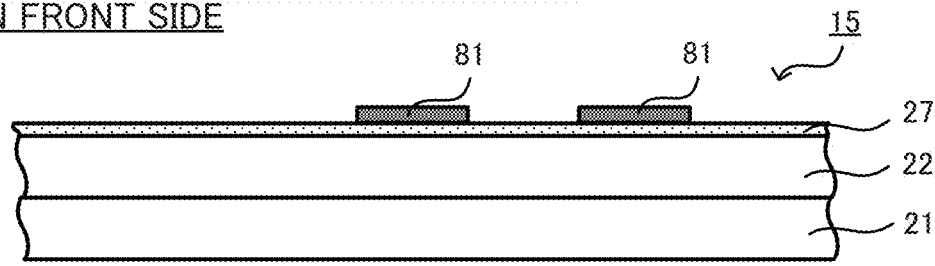
FIGS. 21A to 21E are cross-sectional views explaining the shaped object production processing according to Embodiment 5.

First, a user prepares a thermally expandable sheet 15 on which a shaped object has not been produced, and designates the color image data, the front side foaming data, and the back side foaming data using the display unit 160. Then, the user inserts the thermally expandable sheet 15 into the printing unit 140 with the front side of the thermally expandable sheet 15 facing upward. The printing unit 140 prints a thermal conversion layer (the front side conversion layer 81) on the front side of the inserted thermally expandable sheet 15 (step S51). The printing unit 140 discharges the foamable ink onto the front side of the thermally expandable sheet 15 in accordance with the designated front side foaming data. As a result, the front side conversion layer 81 is formed on the ink receiving layer 27, as illustrated in FIG. 21A. Note that, to facilitate comprehension, an example is illustrated in which the front side conversion layer 81 is formed on the ink receiving layer 27. However, in actuality, the foamable ink is received into the ink receiving layer 27.

Figure 21B:
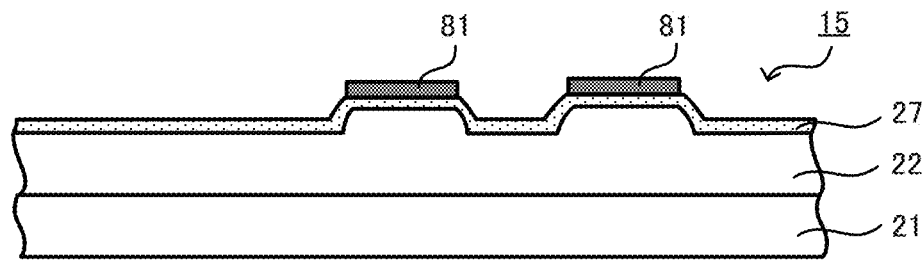

Secondly, the user inserts the thermally expandable sheet 15, onto which the front side conversion layer 81 is printed, into the expansion unit 150 with the front side of the thermally expandable sheet 15 facing upward. The expansion unit 150 irradiates electromagnetic waves on the inserted thermally expandable sheet 15 from the front side (step S52). As a result, the front side conversion layer 81 generates heat and, as illustrated in FIG. 21B, the region of the thermally expansive layer 22 of the thermally expandable sheet 15 where the front side conversion layer 81 is printed distends and rises.

Figure 21C:
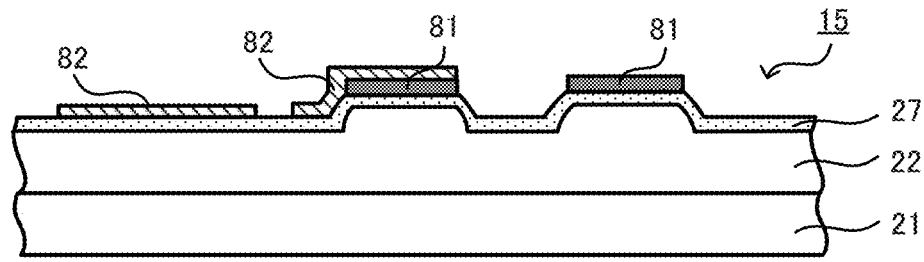

Third, the user inserts the thermally expandable sheet 15, of which a portion of the thermally expansive layer 22 is caused to distend, into the printing unit 140 with the front side of the thermally expandable sheet 15 facing upward. The printing unit 140 prints a color image (the color ink layer 82) on the front side of the inserted thermally expandable sheet 15 (step S53). Specifically, the printing unit 140 discharges the cyan, magenta, and yellow inks onto the front side of the thermally expandable sheet 15 in accordance with the designated color image data. As a result, the color ink layer 82 is formed on the ink receiving layer 27, as illustrated in FIG. 21C. Note that, to facilitate comprehension, an example is illustrated in which the color ink layer 82 is formed on the ink receiving layer 27. However, in actuality, the color ink is received into the ink receiving layer 27.

Fourth, after forming the color ink layer 82, the color ink layer 82 is dried (step S54). In one example, the user inserts the thermally expandable sheet 15, onto which the color ink layer 82 is printed, into the expansion unit 150 with the back side of the thermally expandable sheet 15 facing upward, and the expansion unit 150 heats the inserted thermally expandable sheet 15 from the back side and dries the color ink layer 82 formed on the front side of the thermally expandable sheet 15. Note that step S54 may be omitted.

Figure 21D:
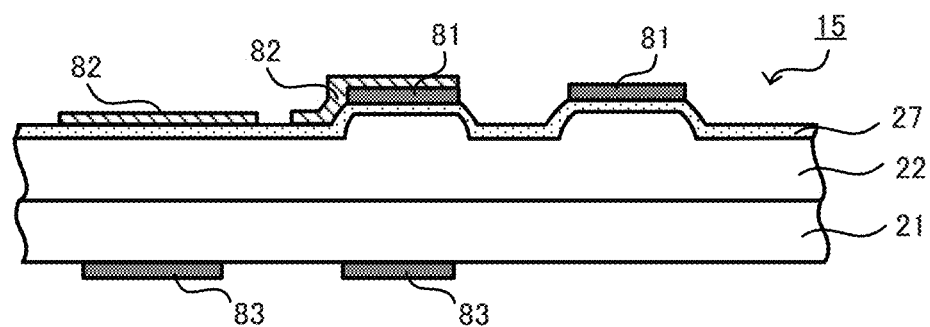

Fifthly, the user inserts the thermally expandable sheet 15, onto which the color ink layer 82 is printed, into the printing unit 140 with the back side of the thermally expandable sheet 15 facing upward. The printing unit 140 prints a thermal conversion layer (the back side conversion layer 83) on the back side of the inserted thermally expandable sheet 15 (step S55). The printing unit 140 discharges the foamable ink onto the back side of the thermally expandable sheet 15 in accordance with the designated back side foaming data. As a result, the back side conversion layer 83 is formed on the back side of the base 21, as illustrated in FIG. 21D.

Figure 21E:
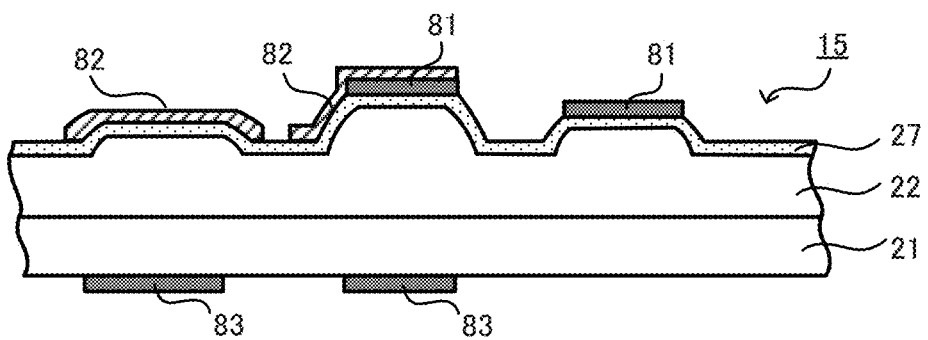

Sixth, the user inserts the thermally expandable sheet 15, onto which the back side conversion layer 83 is printed, into the expansion unit 150 with the back side of the thermally expandable sheet 15 facing upward. The expansion unit 150 irradiates electromagnetic waves and heats the inserted thermally expandable sheet 15 from the back side (step S56). As a result, as illustrated in FIG. 21E, the region of the thermally expansive layer 22 of the thermally expandable sheet 15 where the back side conversion layer 83 is printed distends and rises.

The shaped object is formed using the thermally expandable sheet 15 as a result of carrying out the procedures described above.

With the thermally expandable sheet 15 of the present embodiment, the ink receiving layer 27 can be caused to function as the color adjustment layer 23 described in Embodiment 1 by coloring the ink receiving layer 27. As a result of this configuration, the thermal conversion layer 81 provided on the thermally expandable sheet 15 can be made less conspicuous. Accordingly, the impact of the color of the front side conversion layer 81 on the appearance of the shaped object formed on the thermally expandable sheet 15 can be reduced.

The thermally expandable sheet 15 of the present embodiment may further include the features of the various embodiments described above. For example, a configuration is possible in which the thermally expandable sheet 15 includes the second color adjustment layer 24 described in Embodiment 2 on the back side of the base 21.

Figure 22A:
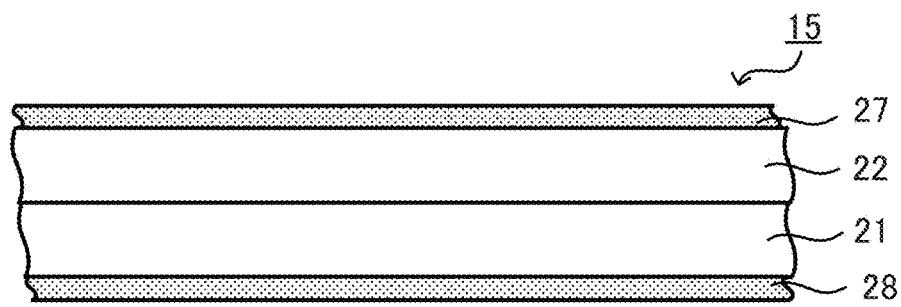
FIGS. 22A to 22C are cross-sectional views schematically illustrating thermally expandable sheets according to other embodiments.

In addition, and particularly when the base 21 is a resin film, a configuration is possible in which a second ink receiving layer 28 is further provided on the back side of the base 21, as illustrated in FIG. 22A. The second ink receiving layer 28 is formed using the same material as the first ink receiving layer 27. Note that the second ink receiving layer 28 need not include the color adjusting agent. However, the second ink receiving layer 28 may include the same color adjusting agent as the first ink receiving layer 27 and function as the second color adjustment layer 24 of Embodiment 2. In this case, the color difference between the second ink receiving layer 28 and the back side conversion layer 83 provided on the second ink receiving layer 28 can be reduced compared to conventional configurations. Here, "conventional configurations" corresponds to cases in which the back side conversion layer 83 is formed on the second ink receiving layer 28 that does not include the color adjusting agent (on an ink receiving layer having the same configuration with the exception of the color adjusting agent).

A configuration is possible in which the thermally expandable sheet 15 includes only the second ink receiving layer 28 that functions as a color adjustment layer. In addition, the thermally expandable sheet 15 is not limited to a configuration including the ink receiving layer 27 of Embodiment 1 and the second ink receiving layer 28 that function as color adjustment layers. A configuration is possible in which, instead of the first ink receiving layer 27, the color adjustment layer 23 described in Embodiment 1 and the thermally expansive layer 25 described in Embodiment 3 are combined.

Figure 22B:
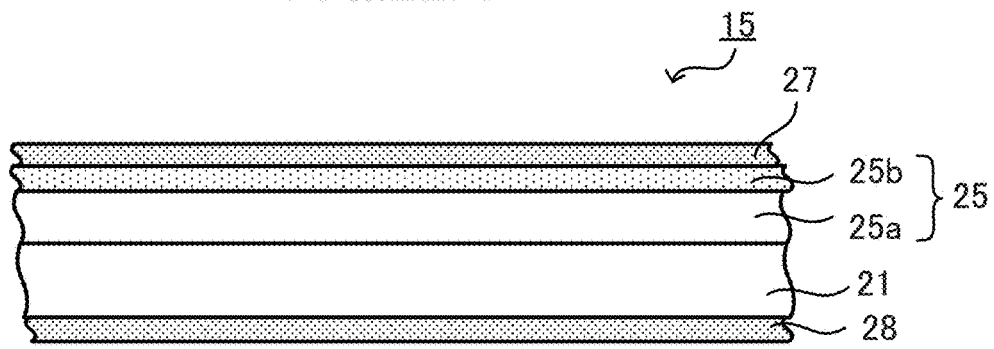

As illustrated in FIG. 22B, a configuration is possible in which thermally expansive layer 25 of the thermally expandable sheet 15 includes the plurality of layers 25a and 25b described above. In the thermally expandable sheet 15, the ink receiving layer 27 is colored and, as such, the layer 25b may include the color adjusting agent or may be free of the color adjusting agent.

Figure 22C:
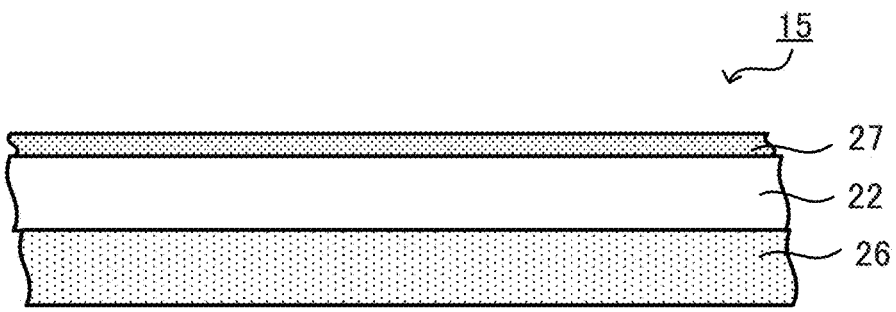

As illustrated in FIG. 22C, with the thermally expandable sheet 15, a configuration is possible in which, as with the base 26 described above, the base 26 itself includes the color adjusting agent.

Embodiment 6

Hereinafter, the drawings are used to describe a production method of a shaped object according to Embodiment 6. The production method of a shaped object according to the present embodiment differs from the preceding embodiments in that the color adjustment layer is formed when producing the shaped object using the same shaping system described in Embodiment 4. Constituents that are the same as those described in the preceding embodiments are marked with the same reference numerals and detailed descriptions thereof are forgone.

Figure 23:
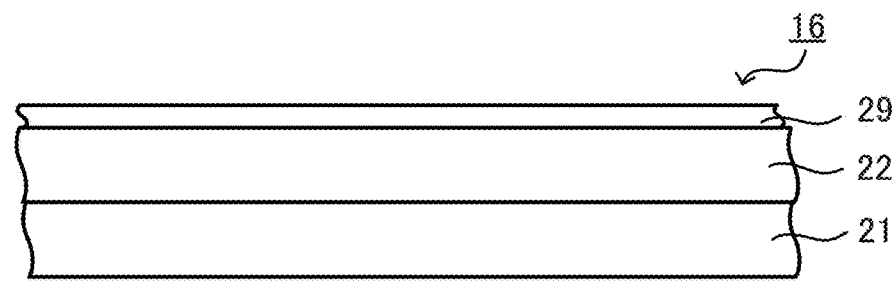
FIG. 23 is a cross-sectional view schematically illustrating a thermally expandable sheet according to Embodiment 6.

A thermally expandable sheet 16 used in the present embodiment is illustrated in FIG. 23. As illustrated in FIG. 23, the thermally expandable sheet 16 includes a base 21, a thermally expansive layer 22, and a third ink receiving layer 29. The base 21 and the thermally expansive layer 22 are the same as in Embodiment 1. The third ink receiving layer 29 is formed using the same material as described for the ink receiving layer 27. As described below, the color adjustment layer is formed on a surface (first side, first surface) of the front side of the thermally expandable sheet 16. The color adjustment layer 23 according to the present embodiment is the same as the color adjustment layer 23 of Embodiment 1. The color difference between the color adjustment layer 23 and the front side conversion layer 81 provided on the color adjustment layer 23 can be reduced compared to conventional configurations that do not include the color adjustment layer 23.

In the present embodiment, since the color adjustment layer is formed when producing the shaped object, the third ink receiving layer 29 need not include the color adjusting agent. However, the third ink receiving layer 29 may include the color adjusting agent when the third ink receiving layer 29 shares the function of the color adjustment layer.

Production Method of Shaped Object

Figure 24:
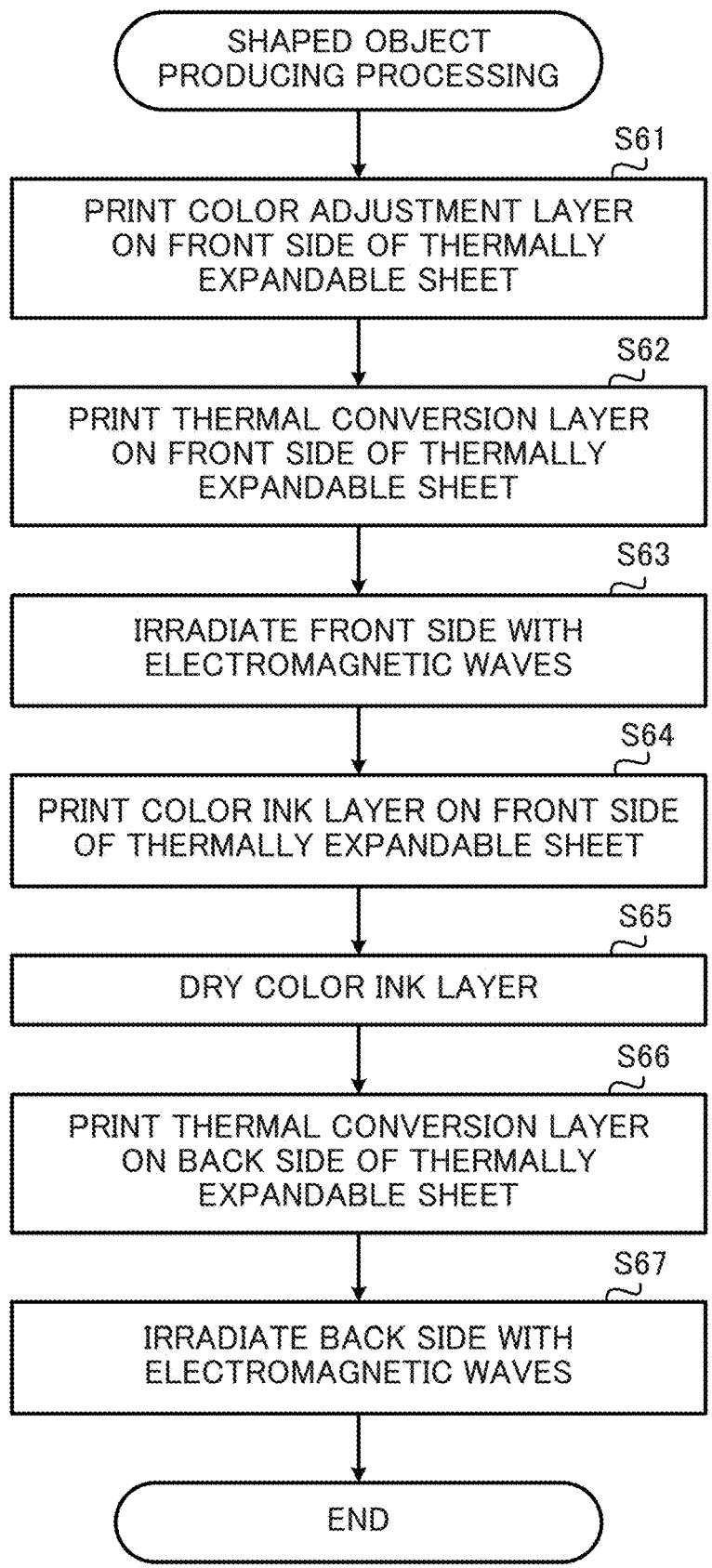
FIG. 24 is a flowchart illustrating shaped object production processing according to Embodiment 6.

Next, an explanation will be given of the flow of processing whereby a shaped object is produced by the shaping system 120 using the thermally expandable sheet 16, while referencing the flowchart illustrated in FIG. 24. Note that steps S62 to S67 are the same as in Embodiment 5 described above and, as such, detailed descriptions thereof are foregone.

First, a user prepares a thermally expandable sheet 16 on which a shaped object has not been produced, and designates the color image data, the front side foaming data, and the back side foaming data using the display unit 160. The color adjustment data for printing the color adjustment layer depends on the foamable ink to be used, and is preset. Then, the user inserts the thermally expandable sheet 16 into the printing unit 140 with the front side of the thermally expandable sheet 16 facing upward. The printing unit 140 prints, on the basis of the preset color adjustment data, the color adjustment layer on the front side of the inserted thermally expandable sheet 16 (step S61).

Here, the color adjustment layer formed in step S61 may be formed over the entire surface of the thermally expandable sheet 16, or may be formed only in regions where the shaped object may possibly be formed.

Second, the user inserts the thermally expandable sheet 16 into the printing unit 140 with the front side of the thermally expandable sheet 16 facing upward. The printing unit 140 discharges the foamable ink on the front side of the inserted thermally expandable sheet 16 in accordance with the front side foaming data, and prints the front side conversion layer 81 (step S62).

Third, the user inserts the thermally expandable sheet 16, onto which the front side conversion layer 81 is printed, into the expansion unit 150 with the front side of the thermally expandable sheet 16 facing upward. The expansion unit 150 irradiates electromagnetic waves on the inserted thermally expandable sheet 16 from the front side (step S63). As a result, the front side conversion layer 81 generates heat, and the region of the thermally expansive layer 22 of the thermally expandable sheet 16 where the front side conversion layer 81 is printed distends and rises.

Fourth, the user inserts the thermally expandable sheet 16, of which a portion of the thermally expansive layer 22 is caused to distend, into the printing unit 140 with the front side of the thermally expandable sheet 16 facing upward. The printing unit 140 prints, in accordance with the stipulated color image data, a color image (the color ink layer 82) on the front side of the inserted thermally expandable sheet 16 (step S64). As a result, the color ink layer 82 is formed on the front side of the thermally expandable sheet 16.

Fifth, after forming the color ink layer 82, the color ink layer 82 is dried (step S65). Note that step S65 may be omitted.

Sixth, the user inserts the thermally expandable sheet 16, onto which the color ink layer 82 is printed, into the printing unit 140 with the back side of the thermally expandable sheet 16 facing upward. The printing unit 140 discharges the foamable ink on the back side of the inserted thermally expandable sheet 16 in accordance with the back side foaming data, and prints a thermal conversion layer (the back side conversion layer 83) (step S66).

Seventh, the user inserts the thermally expandable sheet 16, onto which the back side conversion layer 83 is printed, into the expansion unit 150 with the back side of the thermally expandable sheet 16 facing upward. The expansion unit 150 irradiates electromagnetic waves on and heats the inserted thermally expandable sheet 16 from the back side (step S67). As a result, the region of the thermally expansive layer 22 of the thermally expandable sheet 16 where the back side conversion layer 83 is printed distends and rises.

As a result of carrying out the procedures described above, the color adjustment layer can be formed on the front side of the thermally expandable sheet 16 and, also, the shaped object can be formed.

Note that, in the present embodiment, a configuration is possible in which the second color adjustment layer 24 is provided on the back side of the base 21, as in Embodiment 2 described above. The second color adjustment layer 24 may be formed in advance, as in Embodiment 2, or the base itself may be colored. It is also possible to add a step of forming the second color adjustment layer 24. The timing at which the step of forming the second color adjustment layer 24 is performed may be determined as desired. For example, the step of forming the second color adjustment layer 24 may be performed before or after the step of forming the color adjustment layer (step S61), or may be performed after the step of forming the front side conversion layer 81 (step S62).

In addition, in the present embodiment, particularly when the base 21 is a resin film, a fourth ink receiving layer may be further provided on the back side of the base 21. The fourth ink receiving layer is formed using the same material as the ink receiving layer 27 and the like. The fourth ink receiving layer need not include the color adjusting agent. However, a configuration is possible in which the fourth ink receiving layer includes the color adjusting agent and functions as the second color adjustment layer 24 of Embodiment 2. As with the third ink receiving layer of the present embodiment, it is possible to form a color adjustment layer on the fourth ink receiving layer when producing the shaped object.

In the present embodiment, the color adjustment layer is printed when the shaped object is produced and, as such, the thermal conversion layer provided on the color adjustment layer can be made less conspicuous. In particular, in the present embodiment, there is an advantageous effect in that, even if a thermally expandable sheet is used in which the color ink layer is not formed in advance, the color adjustment layer can be formed by the user.

Additionally, a configuration is possible in which the third ink receiving layer 29 includes the color adjusting agent and is imparted with the function of a color adjustment layer. In this case, a color adjustment layer may be additionally formed when necessary, such as when the printing density of the thermal conversion layer is high.

The present embodiment may be combined as desired with the embodiments described above. For example, a configuration is possible in which, as with the thermally expansive layer 25 described in Embodiment 3, the thermally expandable sheet 16 includes the plurality of layers 25a and 25b, and the layer 25b that is positioned on the front side includes the color adjusting agent. In this case, the thermally expansive layer 22 and the color adjustment layer provided on the third ink receiving layer 29 exhibit color and can make the thermal conversion layer less conspicuous. Additionally, a configuration is possible in which the thermally expandable sheet 16 of the present embodiment includes the second color adjustment layer 24 on the underside of the base 21, as in Embodiment 2. Moreover, a configuration is possible in which the base 26 itself functions as a color adjustment layer, like the base 26 of Embodiment 3.

When using an ink other than water-based ink (for example, ultraviolet curable ink) in the printing unit 140 of the shaping system 120 described above, the ink receiving layer 27 may be omitted. In this case, the thermally expandable sheet 16 includes the base 21 and the thermally expansive layer 22, and the color adjustment layer, the thermal conversion layer, and the like are printed on the thermally expansive layer 22. Note that the drying step (step S65) in the flowchart illustrated in FIG. 24 may be omitted. When using an ink other than a water-based ink in the present embodiment, the thermally expandable sheet 16 may be combined with one or more of the other embodiments described above. For example, a configuration is possible in which, as with the thermally expansive layer 25, the plurality of layers 25a and 25b is provided, and the layer 25b that is positioned on the front side includes the color adjusting agent. Additionally, a configuration is possible in which the second color adjustment layer 24 is provided on the underside of the base 21, as in Embodiment 2. Moreover, a configuration is possible in which the base 26 itself functions as the color adjustment layer, as with the base 26 described in Embodiment 3.

A configuration is possible in which the foamable ink used in the present embodiment includes, in addition to the infrared absorbing agent, colorants that correspond to the complimentary colors of the color of the infrared absorbing agent. For example, when cesium tungsten oxide is used, the thermal conversion layer exhibits a blueish color. In this case, in terms of CMYK, the density of the cyan is greater than the densities of the other colors. In the example described above, the density of cyan (C) is 0.03, the density of magenta (M) is 0.01, the density of yellow (Y) is 0.01, and the density of black (K) is 0.02. Thus, the foamable ink further includes colorants of the complimentary colors, namely magenta (M) and yellow (Y). The color of the thermal conversion layer approaches being non-colored and the brightness is reduced due to the foamable ink including the colorants that correspond to the complimentary colors. As a result, the thermal conversion layer can be made even less conspicuous.

The various embodiments described above are not limited to the examples described in this specification, and can be combined as desired. For example, it is possible to combine a configuration in which the thermally expansive layer is colored, such as in Embodiment 3, with an embodiment that includes a color adjustment layer, such as Embodiment 1 or Embodiment 4. In this case, the front side conversion layer can be made less conspicuous by the colors of the color adjustment layer and the thermally expansive layer. Likewise, Embodiment 2 and Modified Example 2 of Embodiment 3 can be combined. Moreover, Embodiment 4 may be combined with the thermally expandable sheet 11 that includes a color adjustment layer 23, as in Embodiment 1, and the color adjustment layer may also be formed when shaping the shaped object. Additionally, Embodiment 4 can be combined with Embodiment 2 or Embodiment 3, which include the second color adjustment layer 24.

In the production method of a shaped object, the order in which the steps are carried out can be modified as desired. For example, in terms of the flowchart illustrated in FIG. 8, it is possible to execute step S4 and step S5 first, and then execute steps S1 to S3. Additionally, it is possible to switch the orders of step S1 and step S3 and form the color ink layer first and then form the front side thermal conversion layer.

Moreover, it is possible to execute step S1 and step S3 simultaneously. For example, a configuration is possible in which the offset printing device includes the foamable ink in addition to CMYK colors and prints the colors and the foamable ink on the thermally expandable sheet, thereby simultaneously printing the color ink layer and the front side conversion layer.

The step of forming the front side conversion layer (step S1) and the expansion step (step S2) need not be executed consecutively, and it is possible to perform another step between step S1 and step S2. For example, a configuration is possible in which the front side thermal conversion layer is formed (step S1), the back side conversion layer is formed (step S5), and then the expansion step (step S2) is performed.

The color adjustment layer may reduce a visual difference in color tone between a first region where the thermal conversion layer is provided and a second region where the thermal conversion layer is not provided.

In the present embodiment, the expressions "front side," "back side," "top surface," "underside," and the like have been used for the sake of convenience and should not be construed as limiting the orientation in which the thermally expandable sheet is used, the use method, or the like. Accordingly, depending on the use of the thermally expandable sheet, there may be cases in which the side described as the "front" is the "back." The opposite applies as well.

In the shaping systems described in Embodiments 5 and 6, an example is given of a case in which an ink jet printer is used as the printing unit. However, the printing unit is not limited thereto and other printing devices may be used. Depending on the thermally expandable sheet to be used, it is possible to use ink other than the water-based ink. Examples thereof include ultraviolet curable ink and the like.

The drawings used in the various embodiments are provided for the purpose of explaining the various embodiments. Accordingly, the thicknesses of the various layers of the thermally expandable sheet should not be construed as being limited to the ratios illustrated in the drawings. For example, FIG. 1 illustrates that the thickness of the base 21 and the thickness of the thermally expansive layer 22 are substantially equal, but this illustration should not be construed as excluding configurations in which the base 21 is thinner than the thermally expansive layer 22 or the base 21 is thicker than the thermally expansive layer 22. The same is applicable to the other layers as well.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A thermally expandable sheet, comprising:
    a base;
    a thermally expansive layer provided on a first side of the base and including a thermally expandable material that distends in accordance with an amount of heat absorbed;
    a color adjustment layer provided on at least one of the thermally expansive layer or a second side of the base and including a color adjusting agent; and
    a thermal conversion layer provided on part of the color adjustment layer, the thermal conversion layer including a thermal conversion material that converts electromagnetic waves to heat,
    wherein a color difference $\Delta E^*ab$ between a first region where the thermal conversion layer is provided on the color adjustment layer and a second region of the color adjustment layer where the thermal conversion layer is not provided is 13.0 or less, the color difference $\Delta E^*ab$ being calculated using an $L^*a^*b^*$ color system.

2. The thermally expandable sheet according to claim 1, wherein the color difference $\Delta E^*ab$ between the first region and the second region is 3.2 or less.

3. The thermally expandable sheet according to claim 1, wherein the thermal conversion material includes at least one of carbon, lanthanum hexaboride, or cesium tungsten oxide.

4. A thermally expandable sheet, comprising:
    a base;
    a thermally expansive layer provided on a first side of the base and including a thermally expandable material that distends in accordance with an amount of heat absorbed;
    a first ink receiving layer provided on the thermally expansive layer and including a color adjusting agent; and
    a thermal conversion layer provided on part of the first ink receiving layer, the thermal conversion layer including a thermal conversion material that converts electromagnetic waves to heat,
    wherein a color difference $\Delta E^*ab$ between a first region where the thermal conversion layer is provided on the first ink receiving layer and a second region of the first ink receiving layer where the thermal conversion layer is not provided is 13.0 or less, the color difference $\Delta E^*ab$ being calculated using an $L^*a^*b^*$ color system.

5. The thermally expandable sheet according to claim 4, wherein the color difference $\Delta E^*ab$ between the first region and the second region is 3.2 or less.

6. The thermally expandable sheet according to claim 4, wherein the thermal conversion material includes at least one of carbon, lanthanum hexaboride, or cesium tungsten oxide.

7. The thermally expandable sheet according to claim 4, further comprising:
    a color adjustment layer provided on a second side of the base and including a color adjustment agent.

8. The thermally expandable sheet according to claim 4, further comprising:
    a second ink receiving layer provided on a second side of the base and including a color adjusting agent.

9. The thermally expandable sheet according to claim 4, wherein:
    the thermally expansive layer includes a plurality of layers, and
    a layer located closest to the first ink receiving layer among the plurality of layers includes a color adjusting agent.

10. The thermally expandable sheet according to claim 4, wherein the base includes a color adjusting agent.

11. A thermally expandable sheet, comprising:
    a base; and
    a thermally expansive layer provided on a first side of the base and including a thermally expandable material that distends in accordance with an amount of heat absorbed, the thermally expansive layer further including a color adjusting agent; and
    a thermal conversion layer provided on part of the thermally expansive layer,
    wherein a color difference $\Delta E^*ab$ between a first region where the thermal conversion layer is provided on the thermally expansive layer and a second region of the thermally expansive layer where the thermal conversion layer is not provided is 13.0 or less, the color difference ΔE*ab being calculated using an L*a*b* color system.

12. The thermally expandable sheet according to claim 11, wherein:
the thermally expansive layer includes a plurality of layers that include the thermally expandable material, and
the plurality of layers includes a layer located farthest from the base, and at least the layer located farthest from the base includes the color adjusting agent.

13. The thermally expandable sheet according to claim 11, wherein the color difference ΔE*ab between the first region and the second region is 3.2 or less.

14. The thermally expandable sheet according to claim 11, wherein the thermal conversion material includes at least one of carbon, lanthanum hexaboride, or cesium tungsten oxide.

15. The thermally expandable sheet according to claim 11, wherein:
the base includes a colorant or a fluorescent brightener.

16. The thermally expandable sheet according to claim 1, wherein the color difference ΔE*ab between the first region and the second region is 6.5 or less.

17. The thermally expandable sheet according to claim 1, wherein the color difference ΔE*ab between the first region and the second region is 1.6 or less.

18. The thermally expandable sheet according to claim 4, wherein the color difference ΔE*ab between the first region and the second region is 6.5 or less.

19. The thermally expandable sheet according to claim 4, wherein the color difference ΔE*ab between the first region and the second region is 1.6 or less.

20. The thermally expandable sheet according to claim 11, wherein the color difference ΔE*ab between the first region and the second region is 6.5 or less.

21. The thermally expandable sheet according to claim 11, wherein the color difference ΔE*ab between the first region and the second region is 1.6 or less.

* * * * *